United States Patent [19]

Schornack et al.

[11] 4,344,000
[45] Aug. 10, 1982

[54] POWER CIRCUIT CONTROL PROGRAMMABLE TIMER

[75] Inventors: Louis W. Schornack, Niles; Richard Goldstein, Northbrook, both of Ill.

[73] Assignee: Dynascan Corporation, Chicago, Ill.

[21] Appl. No.: 132,088

[22] Filed: Mar. 20, 1980

Related U.S. Application Data

[63] Continuation-in-part of Ser. No. 22,453, Mar. 21, 1979.

[51] Int. Cl.³ ............................................ H01H 43/04
[52] U.S. Cl. ............................... 307/132 E; 307/140; 307/141; 340/309.1
[58] Field of Search ............... 340/309.1, 309.4, 309.5; 307/41, 141.4, 116, 132 E, 140, 141.4, 148.8, 143, 157, 240, 252 B, 590, 96, 141; 315/360, 362, 246; 364/104

[56] References Cited

U.S. PATENT DOCUMENTS

| 3,239,723 | 3/1966 | Washington | 307/130 |
| 4,002,925 | 1/1977 | Monahan | 307/141 |
| 4,035,661 | 7/1977 | Carlson | 307/141 |
| 4,151,425 | 4/1979 | Cappa | 307/130 |

Primary Examiner—L. T. Hix
Assistant Examiner—S. D. Schreyer

Attorney, Agent, or Firm—Wallenstein, Wagner, Hattis, Strampel & Aubel

[57] ABSTRACT

One form of the timer is designed to be mounted over and behind a conventional wall switch cover plate and includes a two position timer condition-setting arm, a rotatable and depressible time setting dial knob and an indicator on the front of the cover plate. When the arm is moved to a timer-on position, the indicator flashes to indicate that timer programming is needed. This may be achieved in real time over the first twenty-four hours after a 30 minute play period by depressing the knob acting as an on and off power switch control push button to turn the light circuit on and off in a normal manner. Fast normal programming is achieved by rotating the knob to various time settings and depressing the knob to set ON or OFF markers in timer memory. A full twenty-four hour programming is completed by either completing a full rotation of the knob over the full twenty-four hour time settings, with at least one ON and one OFF depression, or by a similar pair of knob depressions without such a full rotation, OFF markers then being automatically set by the timer to complete the timer programming. The indicator comes steady-on to indicate that the timer is fully programmed and in an automatic mode of operation. The automatic operation is temporarily overridden by depression of the knob or permanently overridden by a simple distinctive speed or time duration depression of the knob.

38 Claims, 11 Drawing Figures

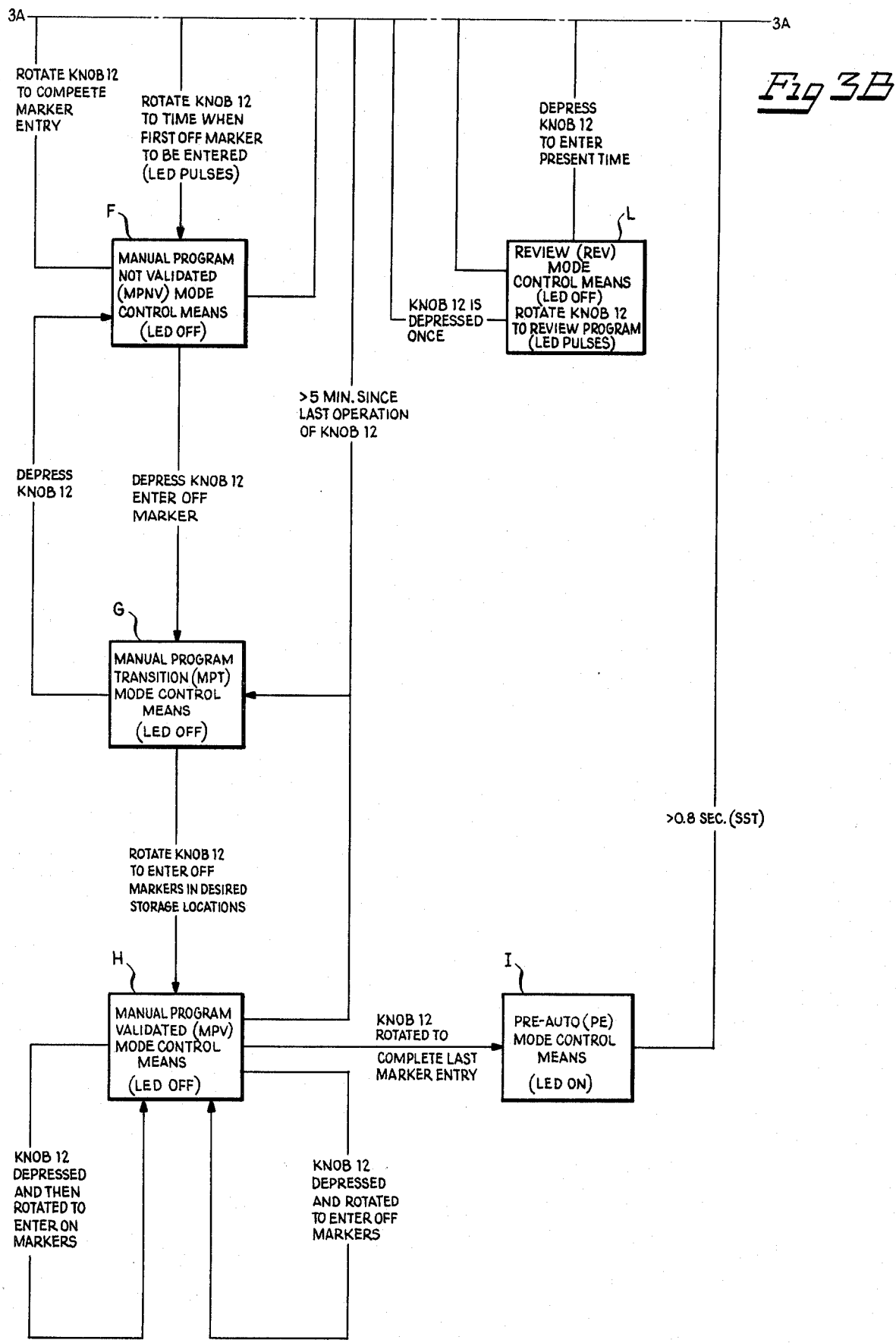

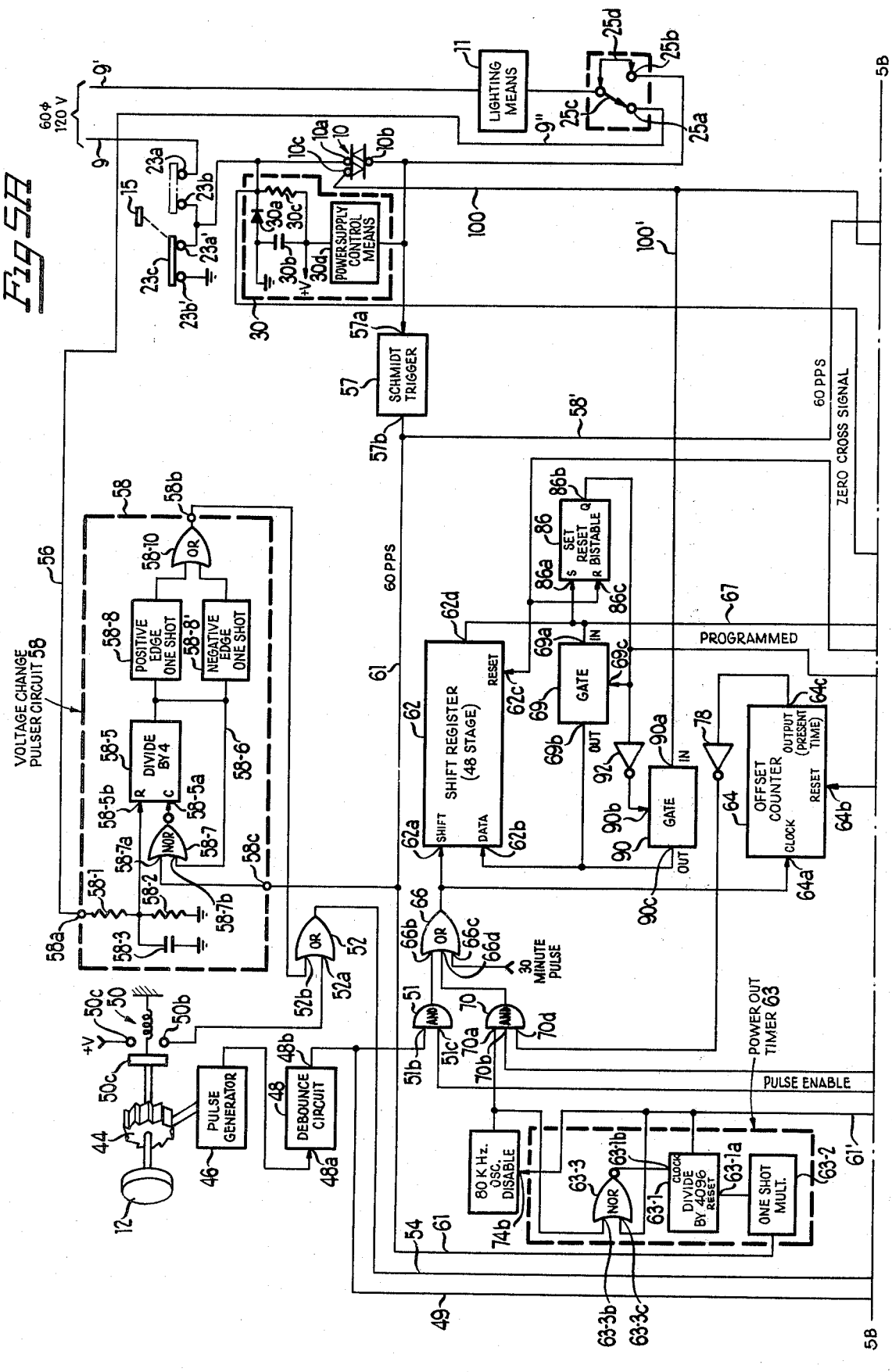

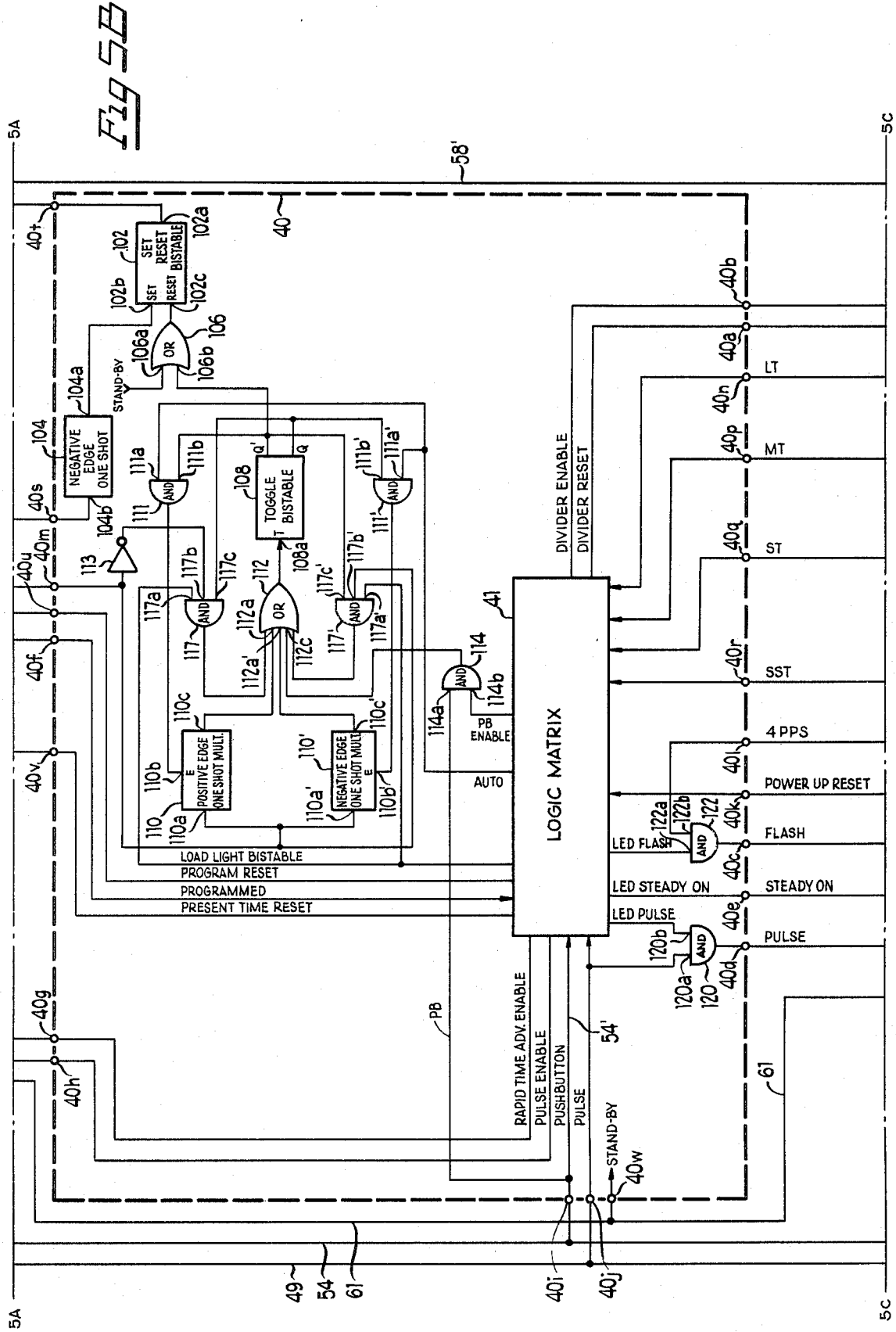

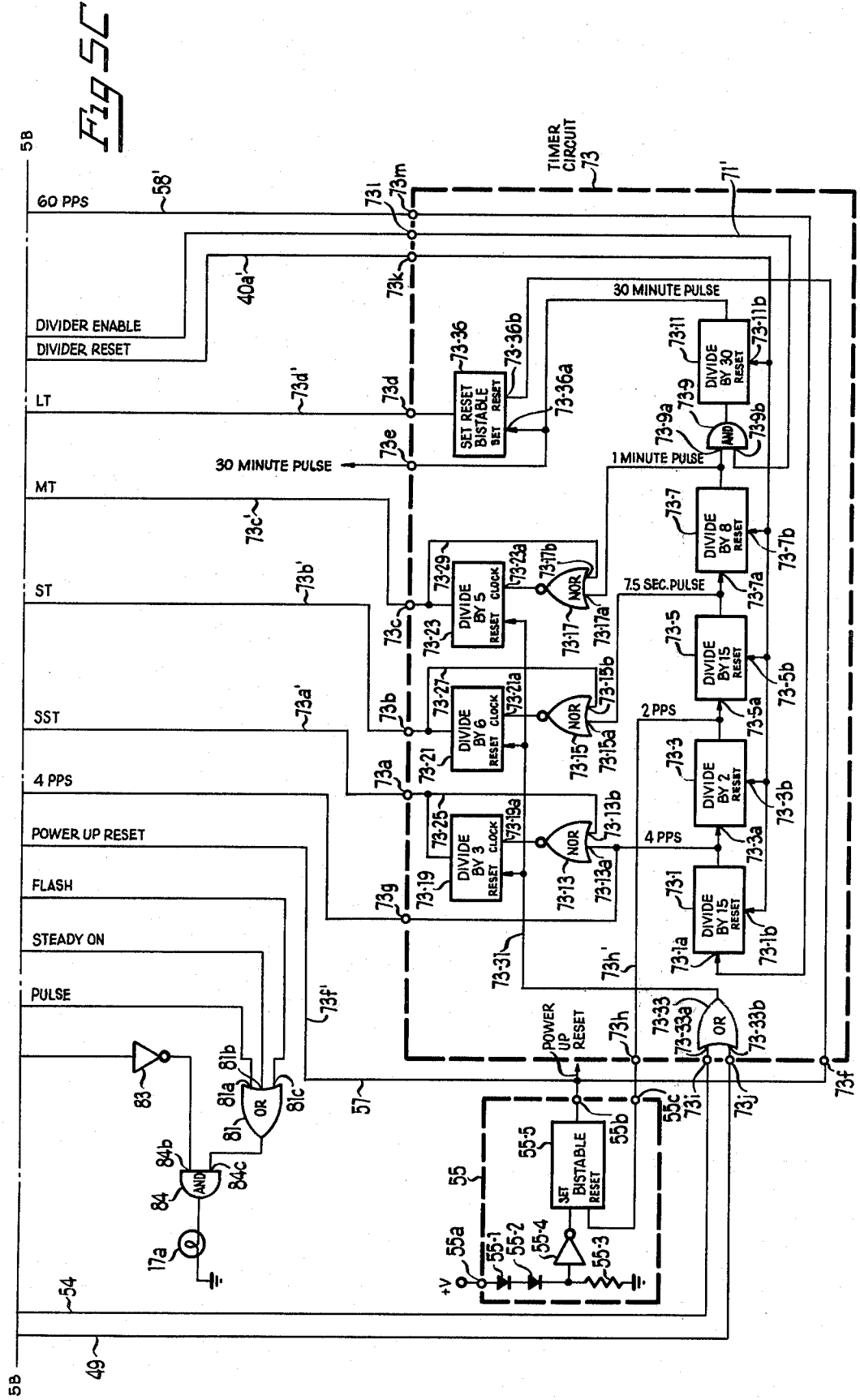

Fig 6A — STATE TRANSITIONS EFFECTED BY LOGIC MATRIX

| | INPUTS | | | | | | | | | MOMENTARY OUTPUTS | | | | |
|---|---|---|---|---|---|---|---|---|---|---|---|---|---|---|
| SST | ST | MT | LT | PUSHBUTTON | PULSE | PROGRAMMED | POWER UP RESET | DETECTED STATE | STATE CHANGED TO | DIVIDER RESET | RAPID TIME ADVANCE ENABLE | OFFSET COUNTER RESET | LOAD LIGHT BISTABLE | PROGRAM RESET |
| | | | | | +V | | | NP | MPE | | | | | |
| | | | | +V | | | | MPE | MPNI | +V | | +V | | |
| | +V | | | | | | | MPE | NP | | | | | +V |
| | | +V | | | | | | MPNI | NP | | | | | +V |
| | | | | +V | | | | MPNI | MPI | | | | | |
| | | +V | | | | | | MPI | NP | | | | | +V |
| | | | | | +V | | | MPI | MPNI | | | | | |
| | | | | | | +V | | MPI | MPNV | | | | | |
| | | | | +V | | | | MPNV | NP | | | | | +V |
| | | | | +V | +V | | | MPNV | MPT | | | | | |
| | | | | | | | | MPT | MPNV | | | | | |
| | | +V | | | | | | MPT | AUTO | | +V | | +V | |
| | | | | | +V | | | MPT | MPV | | | | | |
| | +V | | | | | +V | | MPNV | NP | | | | | +V |
| | | | | | | | | MPV | AUTO | | +V | | +V | |
| +V | | | | | | | +V | MPV | PA | | +V | | +V | |
| | | | | | | | | PA | AUTO | | +V | | +V | |
| | | | | +V | | | | NP | LE | +V | | | | |
| | | | | +V | | | | LE | NP | | | | | |
| | | +V | | | | | | LE | LRN | | | | | |
| | | | | | | | +V | LRN | AUTO | | | | +V | |
| 0 | | | | | +V | | | AUTO | TURNOFF | | | | | |
| 0 | | | | | +V | | | MAN | AUTO | | | | +V | |
| | | | | | | +V | | AUTO | RE | | | | | |
| | +V | | | | | | | RE | AUTO | | | | | |
| | | | | | | +V | | RE | REV | | | | +V | |
| | +V | | | | | | | REV | AUTO | | +V | | +V | |
| | | | | | +V | | | REV | AUTO | | +V | | +V | |
| | | | | | | | +V | DON'T CARE | NP | +V | | | | +V |

Fig 6B — LOGIC CONTROL MATRIX
STEADY OUTPUTS

| DETECTED STATE | LED STEADY ON | LED PULSE | LED FLASH | PUSHBUTTON ENABLE | AUTO | DIVIDER ENABLE | PULSE ENABLE |
|---|---|---|---|---|---|---|---|
| NP | | | +V | +V | | +V | |
| MPE | | | +V | | | +V | |
| MPNI | | +V | | +V | | | +V |
| MPI | | +V | | +V | | | +V |
| MPNV | | +V | | +V | | | +V |
| MPT | | +V | | +V | | | +V |
| MPV | | +V | | +V | | | +V |
| PA | +V | | | +V | | | |
| LE | | | | +V | | +V | |
| LRN | | | | +V | | +V | |
| AUTO | +V | | | +V | +V | +V | |
| TURNOFF | | | | +V | | +V | |
| RE | +V | | | | | +V | |
| REV | | +V | | +V | | | +V |
| DON'T CARE | 0 | 0 | 0 | | | | |

POWER CIRCUIT CONTROL PROGRAMMABLE TIMER

RELATED APPLICATION

This application is a continuation-in-part of our application Ser. No. 22,453, filed Mar. 21, 1979 and entitled Timer and Power Control System.

BACKGROUND AND SUMMARY OF INVENTION

The present invention relates to programmable power circuit control timers of the type which has its most important commercial application as a timer for controlling the energization and de-energization of lighting circuits in a home or the like for security purposes, although certain aspects thereof have a more general application. In such a commercial application, the present invention will form a programmable power circuit control timer of the type to be connected in series with a power cord for a table lamp or the like, in which case it can be incorporated in a self-contained housing adapted to rest on the top of a table, or, in its most preferred form, it is so compact as to be mountable in an existing toggle wall switch opening in place of the toggle switch, and has programming and power on and off controls mounted on the front of one switch station of a single or multiple station wall switch cover plate. A unique timer of this type is disclosed in said copending application Ser. No. 22,453, filed Mar. 21, 1979.

(Our) U.S. patent application Ser. No. 22,453, filed Mar. 21, 1979, describes an electronic timer and power control system in which a shift register is continuously cycled to cause a daily repetition of ON and OFF periods for the control of lights and appliances or the like. The ON and OFF pattern of operation is determined by storing power circuit ON "1" and OFF "0" control markers respectively in each of the storage locations of the shift register. At any given instant of time each storage location in the register represents a definite time interval in the 24 hour cycle, such as one-quarter hour. (The time interval represented by such storage location advances one time interval as the shift register markers are shifted one position.) The control markers can be entered into the storage locations either synchronously, in real time over a 24 hour period, or asynchronously in a relatively short time by manual means.

This application discloses a number of different forms of such a system. The most commercially important form thereof is an extremely low cost 24 hour repeat cycle timer of such small size that it can be completely contained within the small space of an electrical flush switch-receiving box commonly employed to house a wall mounted toggle light switch unit. The front control portion of the timer is also of such small size that it fits over one switch station of any conventional single or multi-station switch cover plate without interfering with the toggle switch of the adjacent station in the latter case.

To accomplish the above objectives, it was necessary to eliminate the usual costly and overly bulky digital read-out and addressing means which prior shift register controlled timers used for identifying and accessing the storage locations during the manual programming of these timers (see Carlson U.S. Pat. No. 4,035,661). Instead of such digital read-out means, the storage locations of the wall switch timer disclosed in our application is most advantageously indicated on the dial of a preferably rotatable and depressible time dial knob which has a discrete number of detented indexable positions. Each detented position of the knob corresponds to a single memory storage location in the shift register. When the knob is rotated, the movement of the knob to each detent position generates a shift pulse that clocks the shift register and advances all markers to the next storage location.

For a 24 hour repeat-cycle timer capable of switching a light or appliance ON or OFF, if each basic timing interval is one-quarter hour, 96 memory storage locations are required in the shift register. In the form of the invention disclosed in our application, the time dial knob when depressed forms a push button control for operating the light circuit involved and programming the timer. Also, it has 48 detent positions so that the knob must be rotated through two complete revolutions to clock the shift register through one complete cycle. This permits the time dial knob to be marked with the familiar 1 to 12 hour indicia like a clock face, with ¼ hour markers placed between the hour markers. An AM-PM indicator adjacent the knob changes when the knob is rotated past the 12 hour indicia. Thus, each index mark on the dial corresponds to a specific quarter-hour, further identified with the particular AM or PM indication on the indicator. This timer is simply programmed by first setting the time dial knob to a present time setting relative to an index mark on the face plate of the timer and then momentarily depressing the knob and the shaft to which it is connected to change the condition of the light circuit involved to the desired condition. Depression of the knob operates a sequence switch which alternately produces voltages which either enter a "1" on marker or leaves a "0" marker in the first stage of the shift register. As the knob is then advanced to its various other positions, the previously set marker is merely duplicated in the first stage of the shift register until a further change in the condition of the light circuit is desired. This greatly reduces the complexity and tedium of setting a manual program into the timer of our invention, as compared, for example, to the previously described relatively costly and bulky digital readout and shift register addressing system as utilized in the Carlson U.S. Pat. No. 4,035,661.

For automatic operation of the timer, the shift register is clocked synchronously in real time by quarter-hour pulses derived from the 60 Hz AC supply. The light circuit involved will be turned ON or OFF by the "1" and "0" markers in the last stage of the shift register for each quarter-hour period involved.

Once the timer has been programmed and is properly synchronized with real time, it is advantageous to provide an indication to the user which enables him to examine the contents of the shift register memory locations. In a timer for home use of this type, it is advantageous to be able to review the program to be assured that the control operations will take place at the desired times. In the timer disclosed in (our) said application Ser. No. 22,453, such an indication is available only within the first time interval (which is there 15 minutes) by advancing the knob through the various time interval positions and noting the results thereof on the lights which are controlled by the timer or a green indicator light.

While the depressible and rotatable knob just described can be used in a similar manner for either effecting a rapid asynchronous programming of the timer or for rapidly reviewing the program, there are still a number of problems associated with these operations which make their use difficult for many persons and could result in errors of operation or non-functioning of the timer. The nature of these problems and the means provided to minimize them will now be described.

It should be recognized that in complying with the physical size limitations as described above, and satisfying the requirement for use with and upon a standard switch cover plate, severe limitations are placed on the number of controls and indicators available to the user. In the commercially practical realization of the invention, and in accordance with one of the improvement features of our present invention, it was found advantageous to provide only a single indicator light to show the status of the timer, a two rather than a three position switch as described in our application for turning the timer ON and OFF and clearing the memory, and a single time dial knob that could be both rotated and depressed. With these controls and indicator, it is most desirable to perform and indicate the status of most and preferably all of the following functions and modes:

1. Provide a timer ON-OFF switch to CLEAR (reset) the memory and to provide an "air-gap" electrical disconnect for safety purposes required by the Underwriter's Laboratory Standards;
2. Indicate the NOT PROGRAMMED and PROGRAMMED status of the program;
3. Change and indicate AUTOMATIC (timed) operation and MANUAL (not-timed) operation operating modes;
4. Manually control the light at all times without disturbing the stored program;
5. Initiate a real-time 24 hour synchronous program period;
6. Terminate a real-time 24 hour program period;
7. Initiate a rapid manual asynchronous program entry mode;
8. Terminate a rapid manual asynchronous program mode when completed;
9. Initiate a program review mode; and
10. Terminate a program review mode.

In attempting to "human engineer" the timer to best satisfy the above requirements within the limitations shown above, many previously mentioned problems occur. Firstly, in using the time dial knob for rapid asynchronous programming or reviewing the program it is necessary to synchronize the indexed dial mark corresponding to the present real time with the last marker storage location so that all the marker storage locations will correspond in real time with the dial knob time indications. This operation is explained to the user as "setting present time" so that whenever the time dial is to be used he would realize that the first step he is instructed to do is to set present time on the dial knob and then "enter" that time by pressing the knob. "Entering" present time by depressing the time knob should not change the state of the light or enter a "1" marker in the shift register (which does so in the timer disclosed in our Application Ser. No. 22,453.

Secondly, in entering a manual program by using the time setting dial it was found that many users had difficulty if present real time was located within a longer time interval during which they wanted to have the light ON. For instance, if the time was 8:00 PM when the user desired to program the timer and he wanted the light ON from 5:30 PM to 11:00 PM, he would have to set the dial to 8:00 PM and depress the dial knob to "enter" present time. Then he would have to press it again without rotating the dial knob to turn the light ON, since present time represented a desired ON time.

To complete his program, he would then have to advance the dial knob to 11:00 PM, depress the time dial knob to turn the light OFF, advance again to 5:30 PM, turn the light ON and advance again to 8:00 PM to complete the 24 hour cycle. This last operation, the joining up of the early segment of an ON interval preceeding present time with that portion of the ON interval following present time, seemed to be a source of considerable confusion.

In accordance with another feature of our present invention, to simplify the operation so that the user can ignore the location of "present time" with respect to a desired ON interval, a system was devised that permitted the user to employ a uniform sequence of operation no matter where present time was located. Thus he could think of actions that always involved first rotating the dial knob to a desired time (present time, "ON" time or "OFF" time) and then pressing the knob to "enter" that time. It was found that the user learned this sequence much more rapidly and easily, because it allowed each dial setting to be associated with a single direction (1) ENTER PRESENT TIME,
(2) ENTER "ON" TIME, or
(3) ENTER "OFF" TIME. After "entering present time" the system permits rotation of the time dial to the first desired ON time. This sequence of time dial knob action is thus always the same, namely to rotate the time dial knob and then depress the same to first enter an "ON" time.

This method of programming is easier, it is believed, because it permits the user to think squentially of (1) "present time", (2) the first desired ON time and (3) the first desired OFF time, (4) the second desired ON time, (5) the second desired OFF time, etc., until he has set as many ON and OFF periods as desired.

The time dial knob is arranged so that it can be turned in one direction only, that is, in the direction that advances the indicated time. When present time is indicated on the time dial knob, it must first be depressed to "enter" present time. This action switches the shift register clock input from a real time pulse source to the output of a pulse switch operated by movement of the dial knob to each shift detected position thereof. There is no restriction on how much the dial knob can be rotated after present time is entered. It can be rotated one step to the first ON time or many complete revolutions to the first ON time. This lack of restriction also aids the user in separating the actions of setting and entering "present time" from the desired first ON and OFF times.

It will be recognized that the above method of programming as so far described will result in the shift register having stage locations containing markers corresponding to the desired ON or OFF condition of the controlled device at the times indicated on the time dial knob. However, when a fully 24 hour period has been programmed in the example program being described, the last location of the shift register will correspond with the time indicated on the dial knob when the first ON marker was stored therein, rather than present time, since it is the appearance of a "1" marker in the last storage location of the shift register that signals completion of a program cycle. In accordance with another feature of the invention, means are provided for automatically advancing the shift register so that it will be automatically advanced until the last storage location corresponds to the time indicated when "present time " was entered. This provides automatic synchronization of the shift register locations with real time. At the same time that this is done, the shift register clock input is switched back to the synchronous real time counter output. Thus the user is freed from any need to synchronize his program with real time beyond the initial entry of present time.

The stated feature that the shift register's last storage location will contain the marker corresponding to the first ON time assumes that the user has completed a 24 hour program cycle by rotating the time dial through two complete revolutions after entering the first "ON" marker. It is likely, however, that he may not have done this. For instance, he may have entered present time at 2:00 PM, then entered a 5:30 PM ON time and 11:00 PM OFF time. Since this may complete his desired program he may neglect to rotate the time dial further. In anticipating of this possibility, in accordance with another feature of the invention, means have been provided in the timer which, after the entry of present time and at least a single ON time followed by an OFF time "wait" five minutes mode of operation is established to allow for further programming, if desired. This means then completes the program with all subsequent timing intervals OFF, and automatically synchronizes the shift register with real time just as if the user had completed the program by rotation of the time dial.

The problem of reviewing the program and returning the shift register to synchronism with real time also involves "human engineering". The review mode of the timer should be possible at any time. In accordance with another feature of the invention, to read out the state of the storage locations of the shift register it is necessary only to clock it through a complete program cycle with the time dial knob after present time is set on the time dial knob and observe the controlled device for an ON or OFF condition at the times indicated on the dial. In order that the storage locations be properly identified with their real times it is necessary to set the time dial knob to the correct present time so that this time will correspond with the last storage location. Then, all the marks on the time dial knob will correspond with the proper storage locations in the shift register for the programmed markers. The review mode is thus started by an "enter present time" operation, namely by pressing the time dial knob after setting the same to the correct present time. This switches the shift register clock input from the real time counter output to a pulser switch output. The time dial knob can then be rotated through a complete cycle to observe the stored program. The cycle can be repeated indefinitely by continuing to rotate the time dial knob. To terminate the review mode the user simply depresses the time dial knob a second time. When the time dial knob is depressed to terminate the review mode, the shift register is automatically clocked by exactly the number of pulses required so that the last storage location thereof will contain the same marker that was present when the review mode was initiated. Thus the shift register is automatically resynchronized with real time. Upon termination of the review mode the timer is placed back into the automatic mode and the indicator light comes on steady. However, to assure that the timer will not be left in the review mode indefinitely if the user fails to terminate review, means is provided which automatically terminates the review mode in approximately 40 seconds if no pulse is received from the pulser switch during that period. It can be seen that the automatic resynchronization of the shift register with real time upon the termination of a review mode makes it impossible for the user to substantially disturb the program as a result of having reviewed the program.

With the constraint in the preferred form of the invention placed upon the number of indicator lights (one) and controls (two) available to the user as explained previously, it became important to use the indicator lamp in a manner that would provide the most useful information to the user. (In the timer disclosed in our application Ser. No. 22,453, a red light is energized during programming and a green light is energized with the light circuit being controlled.) In accordance with another feature of the invention, only one indicator light is provided which has a flashing condition when the timer is on and there are no program markers stored in memory. Since a flashing light is known to attract more attention than a steady light, this condition was selected to signal that there is no program stored in the timer's memory and timed operation will not occur. This feature is particularly useful to call the user's attention to the need to reprogram the timer after a prolonged power failure. (Another feature of our invention is that a power failure of less than a given time like 5 minutes will not cause loss of memory.) A steady-on condition of the indicator light is used to indicate that the timer has been programmed and is in the automatic mode. Means are provided that permits the timer to be in its automatic mode only if a 24 hour program has been completely stored in the memory. Thus the steady-on condition indicates both that there is a complete program in the memory and the timer is in the automatic mode. The steady-on condition enables the user to quickly check his timer prior to leaving his dwelling since that is when he is most concerned with having automatic operation of lighting.

It will be noted that the time dial knob is active in clocking the shift register only when the timer is being asynchronously (rapidly) programmed or the program is being reviewed. In accordance with a specific aspect of the invention, to provide the user with feedback that tells him the time dial knob is active, a brief pulsing of the indicator light occurs with each step of the time dial knob rotation. Also, it is preferred that the asynchronous (rapid) program mode is activated only if:

(1) the indicator light had previously been flashing to indicate that the shift register storage locations had been cleared and was ready to accept a new program;

(2) the time dial knob had been moved (to set present time); and (3) the time dial knob had been depressed to "enter" present time.

The timer disclosed in our application Ser. No. 22,453, can be programmed automatically by the pattern of operations of the depressible time control knob during the first 24 hours after the timer is turned or by asynchronous manual programming by using the time dial knob as described. This requires means for selecting automatically the real time programming mode if the manual programming mode is not selected. It should be noted that the reason for providing the real-time program mode is primarily because many persons find timer programming a difficult task. This is true whether it is a simple mechanical timer with a rotating clock face or a digital time piece such as an alarm clock or wristwatch. To make certain any person, even a small child, could program the timer of this invention, the real-time program mode was made the easiest to use. To accomplish this, the real-time program mode is automatically entered when the power switch is moved from the OFF/CLEAR position to the ON position. Thus, to program the timer the user merely turns it on and uses the depressible timer dial knob as a contact pushbutton for turning on and off the light circuit involved for a period of 24 hours from the time that the light circuit is first deenergized.

In accordance with an important feature of the present invention, prior to the first time the light circuit is turned on, the indicator light will be flashing to indicate that there are no program markers in the memory and automatic operation is not possible. Upon turning the light circuit involved on for the first time the indicator lamp will go out as in the case during the manual programming, signifying the start of a 24 hour real-time program entry period. At the end of the 24 hour period the program is complete and the timer is automatically placed into the automatic mode. Then the indicator light comes steady-on to signal automatic operation is now possible and serves as a convenient signal that the 24 hour real time program has been entered into the memory.

Since the real time program mode is so easily entered, it was judged to be important to prevent the user from being "locked" into this mode when it was not really his intention. This would most likely occur, for instance, right after the user had installed the timer. (It is anticipated that the timer will most often be installed by the homeowner.) Immediately upon installation it will be the most natural action for the user to test the timer by depressing the time dial knob to see if he had normal manual control of the light. The probability is high that he will want to enter a program immediately using the time dial knob. Therefore, in accordance with another feature of the invention, means is provided to prevent the real time program mode from being "locked-in" until the light circuit is energized for at least one-half hour. This provides a half-hour "play period" during which the user may turn the light circuit on and off without getting locked into the real time program mode. Thus each time the light is turned off in the first half-hour the timer will revert to a "not programmed" mode and the indicator light will resume flashing.

It should be noted, also, that the timer reverts to a non-programmed and light circuit opening mode when power is restored following a prolonged power failure (i.e. greater than 5 minutes). In accordance with another feature of the invention, a power failure of less than 5 minutes will not cause loss of memory because such a loss de-energizes most of the timer circuits except those needed to maintain the memory through a voltage stored across a slowly discharging capacitor in the DC power supply. In prior art timers, when temporary loss of power occurs when the light circuit is energized, the light circuit is maintained when power is restored because the memory markers are then left in memory and the time intervals of the storage locations then represent modified time intervals. With the present invention, the loss of the markers is indicated by a flashing light, indicating the need for reprogramming. Reversion of the "not programmed" mode and automatic entry into the real-time program mode also offers the advantage that the timer will be reprogrammed automatically through normal household activity. Thus, a power failure which occurs when the persons who normally program the timer (for instance, the parents of small children) are away from home for a prolonged period, need not deprive the family of the benefit of automatic light operation because the person in charge of the children is unable to reprogram the timer.

The above and other advantages and features of the invention will become apparent upon making reference to the specification to follow, the claims and the drawings.

DESCRIPTION OF DRAWINGS

FIGS. 3A and 3B together form a logic flow and control diagram which indicates how the various modes of operation of the timer are obtained in response to the timing of the operation of the various controls shown in FIG. 1;

FIGS. 5A, 5B and 5C together form an overall more detailed box diagram corresponding to that shown in FIGS. 4A and 4B, except that some of the control elements shown in simplified form in FIGS. 4A and 4B have been shown in more detail; and FIGS. 6A and 6B are tables illustrating the various inputs and outputs to and from the logic circuit matrix shown as a single block in FIG. 5B, the different operating modes of the timer identified in FIGS. 3A and 3B and the input signals to which the matrix responds to produce these operating modes, are the output signals generated by the matrix for each operating mode and each operating mode transition involved.

DESCRIPTION OF EXEMPLARY FORM OF THE INVENTION

Figure 1:
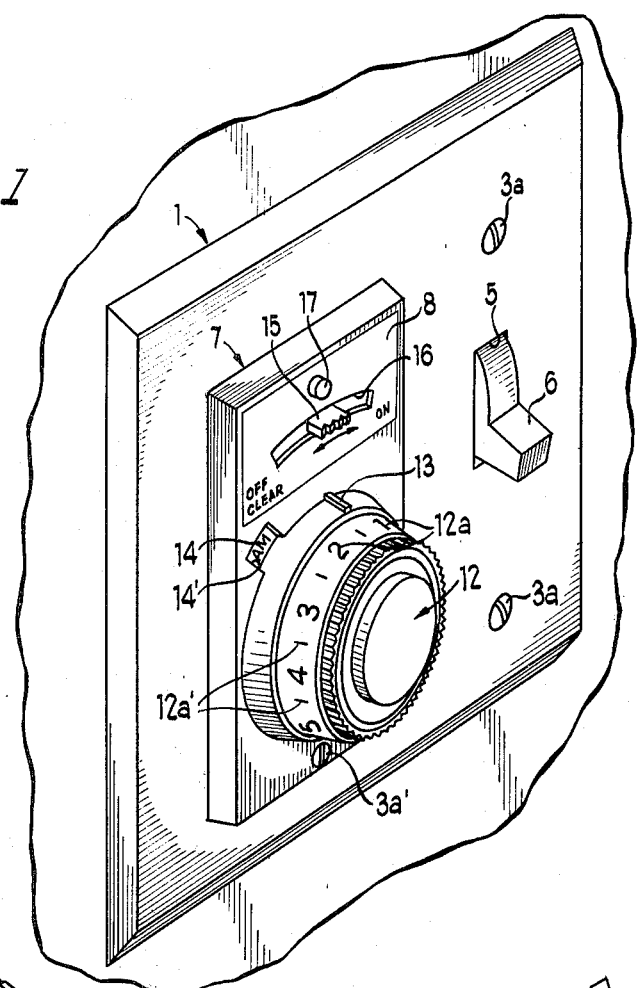
FIG. 1 is a perspective view of a light switch station in a home or the like, which station includes a conventional dual switch covering wall switch cover plate behind which is mounted at one side of the plate a conventional toggle switch with its control arm protruding through one vertical slot in the plate, and behind and over which at the other side of the plate is mounted the timer of the invention with the several controls therefor occupying an area over and beyond the other vertical slot of the cover plate (not shown) through which slot the controls pass to the rear of the plate.
Figure 2:
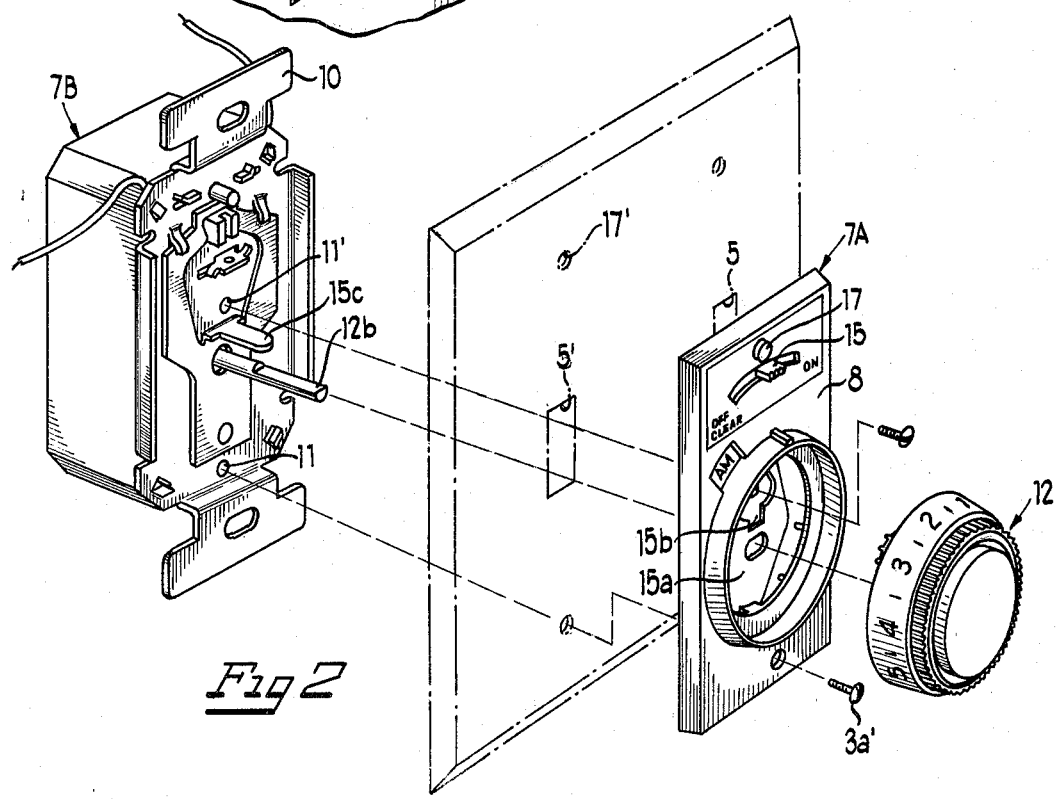
FIG. 2 is an exploded view of the different basic parts making up the timer partially shown in FIG. 1.

Timer Description From User's Standpoint (FIGS. 1 and 2)

Referring now to FIGS. 1 and 2, there is shown a typical dual switch station wall switch cover plate 1 which is mounted over a wall switch opening normally accommodating two toggle switches. As illustrated, the cover plate 1 has on one side thereof a vertical toggle arm-receiving slot 5 through which projects the usual toggle switch arm 6 for operating a switch unit mounted behind the plate upon a metal strap (not shown), as is conventional. The toggle switch arm 6 controls a light circuit different from that controlled by the timer to be described. The timer of the present invention illustrated generally by reference numeral 7, is mounted upon and behind the other side of cover plate 1. The cover plate is anchored in place in a conventional way by a pair of anchoring screws 3a—3a above and below the plate slot 5. The timer has a front housing sub-assembly 7A with a control panel 8 upon which various manually operable controls are accessible. Anchoring screw 3a' anchors the timer front housing sub-assembly 7A and the switch plate 1 to a metal strap 10 (FIG. 2). Another screw 3a', accessible when one of the controls is pulled from the control panel 8 and passing through the other vertical cover plate slot 5', also helps to anchor the cover plate 1 and the front housing sub-assembly 7A of the timer. The screws 3a and 3a'' threads into threaded holes 11 and 11' in the front wall of a timer rear housing sub-assembly 7B (FIG. 2).

One of the timer controls referred to is a rotatable and depressible time dial knob 12 (sometimes referred to also as a time interval setting means). This knob is supported so it has 24 discrete positions and each discrete position thereof brings a new half-hour time setting opposite an index mark 13 on the panel 8. The knob 12 is press-fitted over a depressible shaft 12b projecting from the rear housing sub-assembly 7B and passing through cover plate slot 5'. Also, the shaft 12b or knob 12 is rotatable in only a clockwise direction. The knob 12 has on the side thereof hour indicating indicia and markers 12a, there being 12 such markers representing 12 hours of the day, and half hour-indicating markers 12a' mid-way between the hour indicating markers. The markers 12a and 12a' are individually positionable opposite the index mark 13 on the panel 8 to identify the beginning of the various half-hour time intervals during which the light circuit controlled by the timer is to be energized or de-energized in accordance with a light control program established by the timer. When the knob 12 is rotated through a first 12 hour period, an "AM" or "PM" marker 14' previously visible in an opening 14 in the control panel 8 will change to the other of same, so that the particular "AM" or "PM" hour of the day is indicated. The rotatable time dial knob 12 is also a depressible member so as to act as a power on-off switch control and as a turn-on and turn-off marker signal generating control during the initial programming of the timer. After the knob 12 is initially rotated to a present time setting and depressed once to "enter" present time, each subsequent depression will generally alternately energize and deenergize the lighting circuit involved and, during initial programming of the timer, will set or retain a turn-on or turn-off marker in the timer memory.

There is also exposed on the front of the panel 8 a timer condition setting arm 15 which is movable between two stable extreme positions within a horizontal slot 16 in the panel 8. The arm 15 extends from a shiftable plate 15a in the front housing sub-assembly 7A which has a slot 15b receiving a switch actuating arm 15c projecting forwardly from the rear housing sub-assembly 7B. The extreme left-hand position of arm 15 is in "OFF/CLEAR" position where the timer is turned off and the power circuit involved is completely interrupted by an air gap. When the arm 15 is in its extreme right-hand position, the timer is in an "ON" position to be programmed in the manner to be described and, after completion of programming, unless the knob is depressed in a special manner to be described, the light circuit involved is energized by the markers stored in the timer memory, unless such automatic control is overridden by depression of the knob 12 which will reverse the condition of the light circuit involved.

When the timer of the preferred exemplary form of the invention being described is initially installed, as just indicated, the user will first move the timer condition setting arm 15 to the "OFF/CLEAR" position. If this arm is positioned thusly for at least 5 seconds and then removed to the far right-hand "ON" position, this will initiate a resetting operation of all of the circuits that need to be reset, and initiates a basic "play" period, which is assumed to be 30 minutes (but could be a much shorter period like 20 minutes or so). A LED indicator 17a (shown in FIG. 3A), visible through a lens 17 aligned therewith through an empty screw-receiving opening 17' in the plate 1, will preferably flash at this point in the operation of the timer to indicate a "not programmed" mode of operation of the timer. When starting this "play" period, the LED indicator goes off and any depression of the knob 12 which is not combined with a previous rotation thereof will have no effect on the programming of the unit, but will only be effective in rendering conductive or non-conductive a power triac 10 (FIG. 4A) controlled by the timer. If the depression of the knob 12 turns the light circuit on and the light remains on for the duration of the "play" period, the previously mentioned real time programming of the timer takes place. If the knob 12 is depressed to turn the light circuit off before the play period is over, the timer returns to its "non-programmed" mode of operation. Then, when the knob 12 is rotated to a given detented time setting position referred to as a present time setting, and the knob is depressed to "enter" present time, this initiates manual program modes of operation to be described, where the storage locations in the timer memory are accessed manually as the knob is advanced each one-half hour position. Upon entry of a manual program mode of operation, the LED indicator light goes off, except that the LED indicator will pulse once as the knob 12 is advanced each detented position thereof.

The manual programming of the timer is effected by the user rotating the dial 12 to all of the various hour or half hour time setting positions beyond the first turn-on period and depressing the knob 12 once at each time setting where a change in the light condition is desired at the time setting involved. The first depression of the knob 12 after present time is entered will turn the light circuit involved on. At that point in time and as the knob is further advanced to each subsequent one-half hour setting, an ON "1" marker is entered into a storage location of the timer memory assigned to the time interval involved. When the light circuit is turned OFF by the depression of the knob 12, an OFF "0" marker is entered into the appropriate storage location of the timer memory. Each subsequent one half hour advancement of the knob will continue to enter "0" marker in the corresponding storage locations until the knob is once again depressed. If the user rotates the knob 12 two full revolutions throughout all of the 24 hour positions from the point he has depressed the knob 12 to energize the lighting circuit for the first time and he has depressed the knob once again to turn the circuit off, or he has carried out additional pairs of successive knob depressions so that he ends up with the circuit off, then all the proper programming markers will have been entered into memory and an automatic programming mode of operation will come into being, and the LED indicator comes steady-on.

If the user within a medium time (MT) selected as 5 minutes after each advancement or depression of the knob 12 from the time he "entered" present time depressed the knob 12 only once so as not to complete the identification of one ON time interval, the timer returns to a "not-programmed" condition. If he has depressed the knob 12 twice to identify one ON time interval, but does not rotate knob 12 to all the 48 half-hour settings from the first ON marker setting, the manual programming mode of operation will automatically be completed by the automatic entry of "0" markers in the remaining unaccessed storage locations, so that the timer becomes fully programmed and is in an automatic operating mode.

It should be recalled that when the timer condition setting arm 15 is moved from the "OFF/CLEAR" position to a "TIMER-ON" position for the first time, and the 30 minute play period expires, if the knob 12 is not subsequently rotated within a 24 hour period, the storage locations of memory are synchronously accessed in real time to provide automatic real time programming of the timer where each depression of the knob 12 to turn the light circuit involved in the normal manner on or off will enter or retain an ON "1" or OFF "0" marker in the timer memory. After completion of a real time 24 hour programming of the timer, the timer is in an automatic operating mode where the light circuit involved is controlled automatically in accordance with the markers in memory, even if the operator does not do anything else to the timer. This real time programming permits anyone to program the timer with no effort beyond turning the timer to ON.

If the user desires to disable the automatic operation of the timer without losing the markers in memory, he depresses the knob 12 in a distinctive manner, like two fast depressions thereof less than 0.8 seconds apart (or once for a prolonged period). Then single short depressions of the knob 12 will turn the light circuit on an off in a normal manner. The automatic mode of operation of the timer is re-established by again operating the knob in the distinctive manner referred to.

One important feature of the present invention is the ability of the timer to hold its memory even if there should be a loss of power for not more than about 5 minutes. If there is a loss of power for less than about 5 minutes, a DC power supply capacitor will hold a sufficient charge to be able to energize the memory maintaining portion of the timer, and circuit disabling means are brought into play when power is loss to disconnect the DC power supply from the portions of the timer not needed to maintain memory. If power is interrupted for more than about 5 minutes, memory is lost and this will be indicated by the flashing of the LED indicator which shows that the timer has returned to a "not-programmed" mode of operation.

Figure 3A:
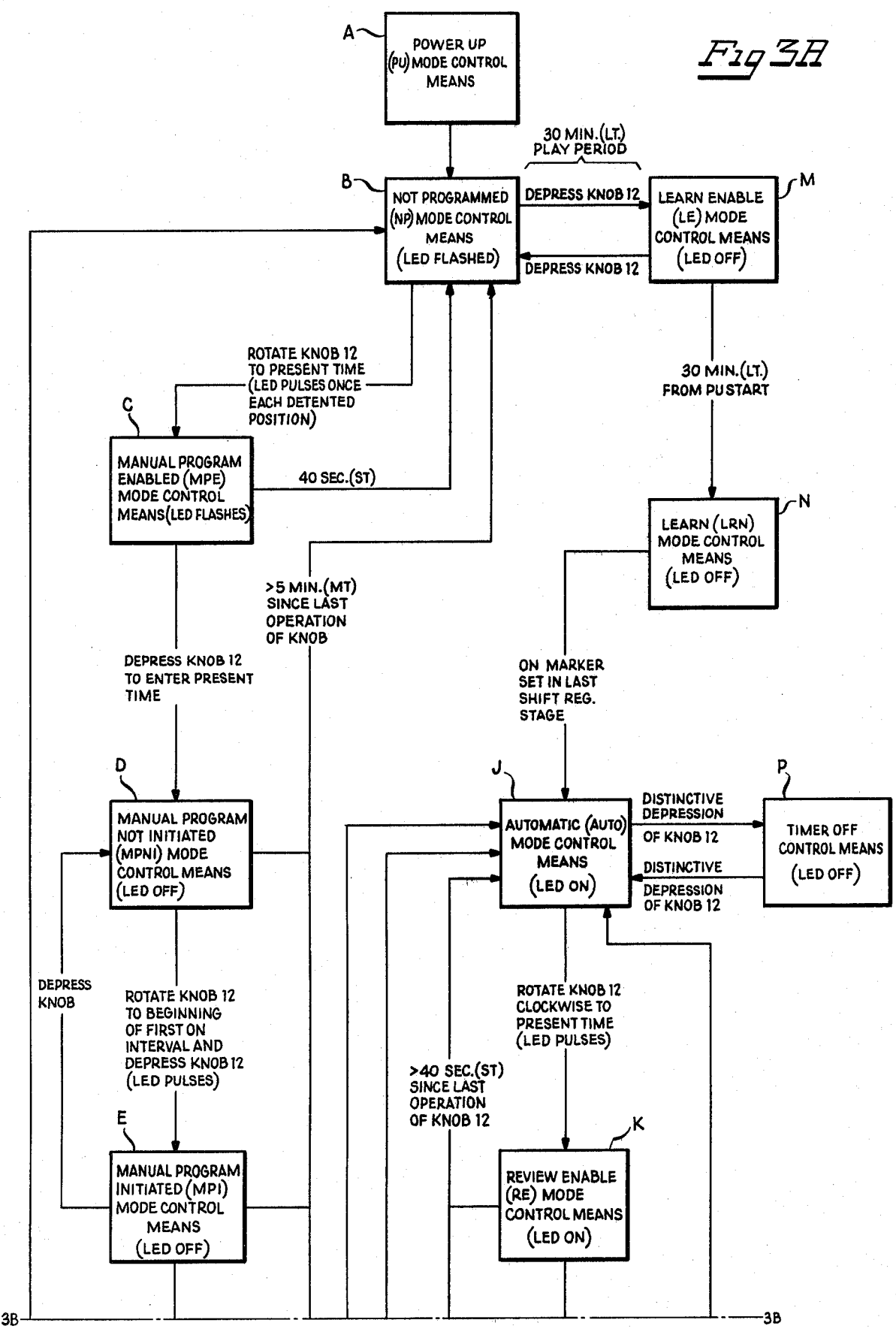

Operation of Timer Explained From Logic Flow and Control Diagram of FIGS. 3A and 3B The various modes of operation of the timer in the preferred from of the invention are illustrated in FIGS. 3A and 3B which, for the most part, is self explanatory. The nomenclature and abbreviations of the different modes of operation needed to best understand the logic circuit matrix table of FIGS. 6A and 6B are shown in FIGS. 3A and 3B. As there shown, when the timer condition setting arm 15 is first moved to the "ON" position from the "OFF/CLEAR" position under circumstances where memory has been lost or had not been established, the timer is in what is referred to as a "power up" (PU) mode of operation identified in block A representing the control means which effects this control. Control B then causes the timer to enter the "not-programmed" (NP) mode of operation previously described where the LED indicator 17a flashes. For the next 30 minutes, as long as the knob 12 is not rotated in a clockwise direction, (counterclockwise rotation thereof causes slipping of the knob and no detented rotation of the knob shaft) a "play" period takes place where the knob 12 may be depressed successively to turn the light circuit on and off at will. The first time the knob 15 is depressed under these conditions, control means M causes the timer to enter a "learn enable" (LE) mode of operation where the LED indicator turns off. At the end of the "play" period, or at any time during the "play" period when the last depression of the knob 12 turns the light circuit off, control means B causes the timer to return to the NP mode of operation. After this 30 minute play period, beginning with the time that the control knob 12 is thereafter first depressed to turn the light circuit on, control means N causes the timer to enter the "learn" (LPN) mode of operation when the LED indicator is off. As the control knob 12 is depressed throughout the following 24 hour period from the time the push button 12 was first depressed after the 30 minute play period is over, light turn-on and turn-off markers are set in the storage locations of a memory identified with the particular timing interval involved. During this period the different storage locations of memory assigned to the various time intervals are accessed synchronously. At the end of this 24 hour period, control means J causes the timer automatically to enter an "automatic" (AUTO) mode of operation where the LED indicator comes steady-on. At any time during this AUTO mode of operation, as previously indicated, if the control knob 12 should be depessed once, this will temporarily override the automatic control over the light circuit at that particular time, and reverse the condition of the lights involved. If the knob 12 is depressed again, the condition of the lights will return to the same condition for which the automatic control thereof would become re-established. (Permanent override of the automatic control is only achieved by the aforesaid distinctive depression of the knob 12. This is achieved by control means P shown in FIG. 3A.)

If it is desired to determine the actual pattern of turn-on and turn-off markers which are stored in the storage locations of the memory, the timer can be operated in what is referred to as "review enable" (RE) and "review" (REV) modes of operation shown in the control means-indicating boxes K and L in FIG. 3, where the synchronous accessing of the memory storage locations is terminated.

The RE mode of operation is entered by control means K when the user first advances the control knob 12 to bring the hour or half hour marker 12a or 12' opposite the index mark 13 which identifies present time. The LED indicator is then steady-on. When the user then depresses knob 12 he "enters" present time, and control means L causes the timer to enter the REV mode of operation. Then, as the control knob 12 is advanced in a clockwise direction to each detented one half hour time position to bring the various markers 12a and 12a' opposite the index mark 13, a storage location accessing pulse is generated and the marker stored in each accessed location for the time interval involved is identified by the actual state of the light circuit for the time interval involved. To re-enter the AUTO mode of operation from the REV mode of operation, it is only necessary to depress the control knob 12 once. Also, if the user forgets to depress the control knob 12 to enter the automatic mode of operation beyond a basic timing period, which was selected as a short timing (ST) period referred to as 40 seconds, then AUTO control means J causes the timer to return to the said AUTO mode of operation from either the REV or RE modes of operation. As previously explained, the manual program modes of operation of the timer are entered from the "not-programmed" (NP) mode by first rotating the control knob 12 clockwise at least one position where a control means C causes the timer to enter what is referred to as a "manual program enabled" (MPE) mode of operation, where the LED indicator continues to flash. The control knob 12 is rotated in a clockwise direction to bring the marker 12a or 12a' representing present time opposite the index mark 13, after which the user depresses the control knob 12 once to enter present time. Then, control means D causes the timer to enter what is referred to as a "manual program not initiated" (MPNI) mode of operation. (The LED indicator pulses once as the control knob 12 is moved to each detented position thereof.) After such a present time setting and entering operation, as previously indicated the next depression of the control knob 12 will be effective in first turning on the light circuit involved and entering a turn-on marker into the storage location which is accessed, as determined by the number of pulses which are generated by the control knob 12 since the present time setting.

The first light circuit turn-on depression of the knob 12 after the knob is advanced to a time setting identifying the beginning of an ON time interval causes control means E to operate the timer in a "manual program initiated" (MPI) mode of operation. As the control knob is further advanced clockwise after the first on-time setting, ON markers are entered into the various storage locations of the timer memory as each detented position of the control knob generates a pulse to access a new storage location, and a control means F causes the timer to enter a "manual program not-validated (MPNV) mode of operation. The control knob 12 is advanced by the user to the time setting identifying the end of an ON time interval, which is the beginning of a desired OFF time interval. If, by mistake, the user should rotate the control knob quickly beyond the various possible marker setting positions thereof before he depresses the control knob 12 to enter a first OFF marker, a control means D will respond to this mistake by returning the mode of operation of the timer to the "manual program not initiated" mode of operation. However, if the user correctly depresses the control knob 12 to turn the light circuit off and to insert an OFF marker into the timer memory starting at the previous time setting of the control knob involved, then control means G operates the timer in a "manual program transition"(MPT) mode of operation. If the user depresses the control knob 12 again without rotating the knob, in effect to cancel the "OFF" marker which he has just set, control means F will then return the timer to the "manual program not validated" mode of operation. However, if he rotates the knob 12 for further entry of a first OFF marker, then control means H operates the timer in a "manual program validated" (MPV) mode of operation where the timer will be automatically or manually operated into a completed program or "automatic" (AUTO) mode of operation in the manner to be described.

When the timer is in the "manual program validated" mode of operation, the user can enter other ON and OFF markers at desirable time settings by depressing the control knob 12 to turn the lighting circuit ON, followed by rotation of the control knob 12 to the time settings for which an ON time interval is desired, and similarly can depress the control knob 12 to enter OFF markers in the storage locations identified by the rotation of the control knob 12, to complete a desired pattern of ON and OFF time intervals for the lighting circuit involved. When the control knob 12 is manually rotated to a time setting which completes marker entries in all of the storage locations, a control means I will operate the timer in a "pre-auto" (PE) mode of operation. After a short period of time greater than about one second, as for example, a period greater than 0.8 seconds, the control means J will operate the timer in the "automatic" mode of operation. If the "pre-auto" mode of operation is entered by the user advancing the control knob 12 quickly up through and beyond the point where the last ON marker is added to the last storage location of the timer memory, the automatic control means J will not respond to the extra control pulse generated by the advancement of the control knob 12 beyond the point where the last marker is entered in the last available storage location of memory. If the timer had then been in an "automatic" mode of operation, then the control means J would have responded to this extra pulse by shifting the timer into a "review enable" mode of operation previously described, an obviously undesirable mode of operation when the control knob is spun quickly to complete a manual programming operation.

Some of the control means shown in FIGS. 3A and 3B respond automatically to the passage of various time intervals, to shift the mode of operation of the timer from one mode to another. Thus, when the timer is in the MPNV, MPI or MPNI modes of operation, and the timer has not been advanced to the "manual program transition" mode of operation referred to within a medium time (MT) interval selected to be five minutes since the knob 12 was last rotated or depressed, control means B will cause the timer to return to the "not programmed" mode of operation. Also, when the timer is in either the "manual program transition" or the "manual program validated" mode of operation, and nothing is done by the user to advance the timer to the "automatic" or "pre-auto" modes of operation of the timer, within the five minute time interval described (i.e. since the last rotation or depression of the control knob 12), then control means J will automatically shift the timer into the "automatic" mode of operation by entering or retaining OFF markers in the remaining unaccessed storage locations of the timer memory. Also, when the timer is in the "manual program enable" mode of operation entered by the setting of knob 12 to present time, if the knob 12 is not depressed to "enter" present time within 40 seconds, control means B returns the timer to the "not-programmed" mode of operation.

Figure 4A:
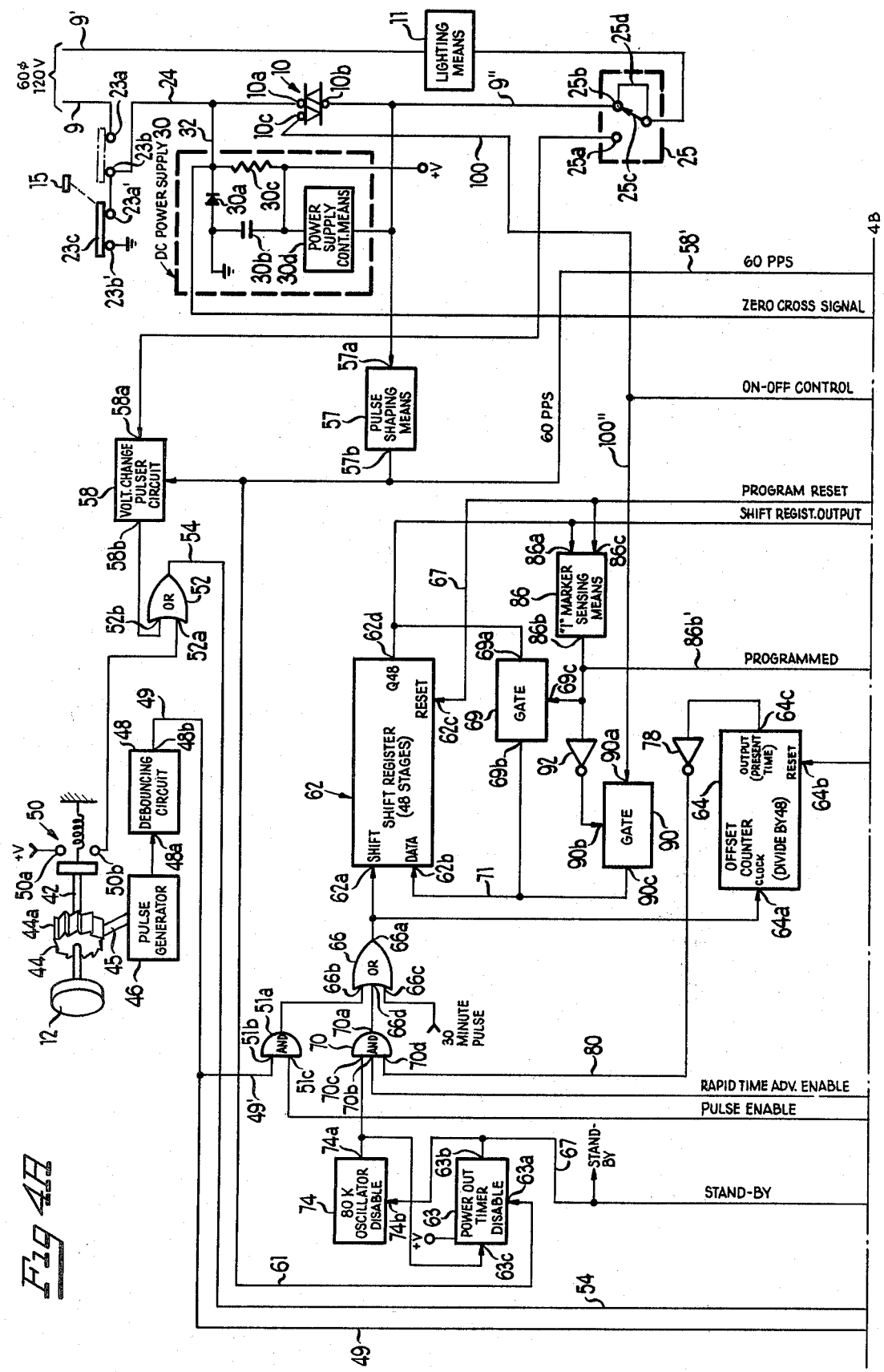
FIGS. 4A and 4B together form a box diagram of the basic control elements of the timer of the present invention and the power circuit controlled thereby including a lighting circuit, a three-way switch in series therewith and a power triac forming part of and controlled by the other portions of the timer of the invention.
Figure 4B:
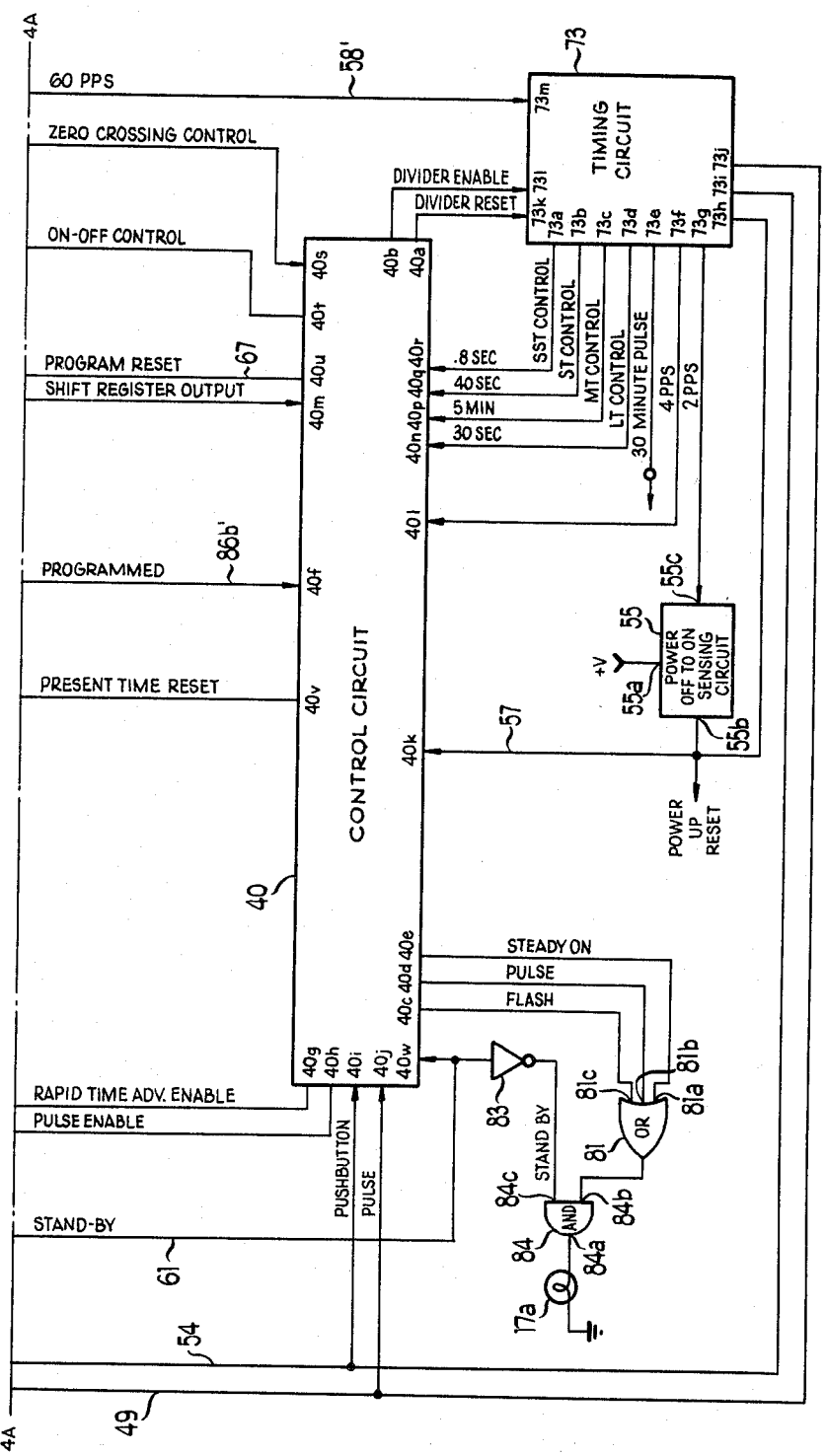

Description of Simplified Block and Circuit Diagram of FIGS. 4A and 4B

As shown in FIG. 4A, the circuit controlled by the timer shown in a lighting circuit energized from a pair of 110 volt, 60 cycle power lines 9—9'. The timer also derives its energizing power from these power lines 9—9' but indirectly therefrom in a manner to be described. The power line 9 is shown extending to a pair of spaced stationary contacts 23a-23b which can be bridged by a wiper 23c whose position is determined by the movement of the timer condition setting arm 15. The contacts 23a-23b are bridged by the wiper 23c when the arm 15 is moved to the right-hand "ON" position. A conductor 24 extends from the stationary contact 23b to one of the load terminals 10a of the power triac 10 whose other load terminal 10b is connected by a conductor 9" to a 3-way switch 25. While the present invention is operable without the presence of such a 3-way switch, it is extremely useful if the present invention can be incorporated into any wall switch station position which may already be wired in series with a 3-way switch. The logic of the present invention is designed to accommodate both programming and light turn-on and turn-off operations through operation of either the 3-way switch or the control knob 12. (The 3-way switch controlled aspect of the invention is a sole invention of Louis Schornack.) The 3-way switch 25 has a wiper 25c movable between a stationary contact 25a and 25b. A jumper 25d is shown interconnecting the stationary contact 25b with the wiper 25c. A conductor 26 extends between the wiper 25c and one or more lighting devices on lamps connected in parallel, identified as lighting means 27 in FIG. 3A. The stationary contact 25a is connected to a pulse generating circuit to be later described which generates a pulse each time the wiper 25c is moved between the contacts 25a and 25b.

The DC voltage utilized to energize the various circuits to be described is obtained from a DC power supply 30 which must obtain its energization from across the load terminals 10a and 10b of the power triac 10, since there is only one direct connection to a power line available in any wall switch opening in which the present invention is desirably mounted. (It should be understood, however, that the present invention is also applicable to timer applications which are table mounted or mounted in some other location than a wall switch box, in which case access to both power lines 9 and 9' would normally be available.)

The power triac 10 is controlled in a well known manner wherein a control terminal 10c thereof is connected to a source of current which can render the power triac 10 conductive generally at a point within several degrees after the time the applied AC voltage passes through zero each half cycle involved. However, this short period during which the power triac 10 is non-conductive is sufficient to provide a voltage drop across the terminals of the power triac to energize the DC power supply which charges a capacitor 30b through one or more rectifiers like 30a shown in FIG. 4A. (There are a number of such prior art DC power supplies which can be used.) As shown in FIG. 4A, a conductor 32 connected to the triac load terminal 10a extends to the juncture of rectifier 30a and a resistor 30c whose terminals are connected across the plate terminals of capacitor 30b. The anode of rectifier 30a and the plate of capacitor 30a is shown connected to ground and the ungrounded plate of capacitor 30b is shown connected through a suitable control circuit 30d to the other load terminal 10b of the power triac 10. Suffice it to say, the DC power supply develops across the capacitor 30 a charge sufficient to energize all the circuits referred to, and to energize at least the memory portions of the circuit to be described for at least about 5 minutes should power be completely interrupted for such a period. This is useful in accordance with one of the aspects of the invention where, upon a less than 5 minute time power failure, the programming of the timer is not lost because of the selected energization of only the memory retaining circuits. A V+ DC voltage output terminal 32 is shown connected to the ungrounded plate of the capacitor 30b. (For a very useful DC power supply energized in the manner described, reference can be made to copending application Ser. No. 60,578, filed July 25, 1979, now U.S. Pat. No. 4,270,058)

When the timer condition setting control arm 15 is on "OFF/CLEAR", the wiper 23c bridges a pair of contacts 23a' and 23b'. The contact 23a' is shown connected to the contact 23b previously described and the contact 23b' is shown grounded. It is apparent, therefore, that when the wiper 23c bridges the contacts 23a' and 23b', the resistor 30d is connected directly across the capacitor 30b to form an air gap interruption of the power circuit required for UL approval of the timer and to discharge the capacitor 13a to de-energize the entire timer system.

As previously indicated, as the control knob 12 is advanced each detented position, a storage location accessing pulse is generated, and as the control knob 12 is depressed, a signal is generated to set a turn-on or turn-off marker in an appropriate storage location of a memory which, in the most preferred form of the invention, is a shift register to be described which has 48 stages in the case where we have 48 one half hour marker accepting time intervals within a 24 hour period. While these pulses and signals can be generated in a variety of ways, in FIG. 4A the control knob 12 is shown connected to a shaft 42 carrying a ratchet 44 along the periphery of which slides a spring 45. The spring 45 acts as a detenting spring so that the control knob has the 24 discrete positions within one clockwise revolution thereof, and in the preferred form of the invention also acts as a control arm for causing a pulse generator 46 to generate a pulse each time the detent spring 45 slips off the highest portion of a detent tooth and falls within the bottom of the recess between successive teeth. (It will be recalled that the control knob 12 on the shaft is rotatable in only a clockwise direction so that the shaft can only be rotated in a clockwise direction.) This pulse generator 46 may preferably comprise a piezoelectric element which is unstressed suddenly as the detent spring falls off the end of a ratchet tooth, to generate an initially large amplitude gradually decaying amplitude sinusoidal-like waveform which is converted to a single pulse by any suitable "debouncing" circuit 48 known in the art. Such a pulse generating circuit is desirable because it cannot generate a false pulse of any significant amplitude by vibrations or teasing the knob, as is readily possible with pulses formed by making or breaking contacts. The output 48b of the debouncing circuit 48 is coupled by a control line 49 to the input 40j of a control circuit 40, and the input 73j of timing means 73 (FIG. 4B) and also by a control line 49' to the input 51b of an "AND" gate 51 which controls the asynchronous accessing of the storage locations of the timer memory, namely the shift register 62 in FIG. 4A. Control circuit 40 may comprise logic circuit elements as well as a logic matrix controller 41 (FIG. 5B), the operation of which is illustrated by the charts shown in FIGS. 6A and 6B and by the flow diagram of FIGS. 3A and 3B.

The end of the shaft 42 bears against an outwardly springurged movable contact 50c. When the control knob 12 is depressed, the movable contact 50c bridges a pair of stationary contacts 50a and 50b to couple the output of the DC power supply to a conductor 53 extending to the input 52a of an "OR" gate 52, whose other input 52b is connected by conductor 60 to the output 58b of a voltage change pulser circuit 58 shown in detail in FIG. 5A to be described. The voltage change pulser circuit 58 has an input 58a connected by a conductor 56 to the stationary contact 25a of the 3-way switch 25. As previously indicated, as the wiper 25c of the 3-way switch is moved between engagement with the stationary contacts 25b and 25a, the voltage conditions at the stationary contact 25a will shift between a condition where it receives a 60 cycle voltage to a condition where it receives no voltage. The voltage change pulser circuit 58 is one wherein, upon each change of condition of the input voltage, it will generate a positive pulse at the output terminal 58b fed to "OR" gate 52, thereby duplicating the signal conditions produced by the successive depression of the control knob 12. Accordingly, as the control knob 12 is depressed or wiper 25c of the 3-way switch 25 is moved from one contact position to another, a positive pulse will appear at the output of the "OR" gate 52 which is connected by a conductor 54 to the control circuit 40 to effect ON and OFF marker setting and power triac turn-on and turn-off operations.

It is apparent from our previous description of the basic modes of operation of the logic flow and control circuit diagram of FIGS. 3A and 3B that there is provided a means for generating a signal, such as a momentary pulse, when the power is initially applied to the timer. To this end, an initial poweroff-to-on sensing circuit 55 (FIG. 4B) is provided (which is shown in more detail in FIG. 5C) which has an input 55a connected to the DC output of the V+ terminal of the DC power supply 30. As the capacitor 30b of the DC power supply charges up to its normal maximum voltage (of about +4 volts), a single pulse appears at the power-up reset output 55b of the sensing circuit 55, which pulse is coupled by a conductor 57 to power-up reset input 40k of control circuit 40. This pulse initiates the "power-up" mode of operation of the timer.

As previously indicated, means are provided for disabling the higher current-draining portions of the timer when power on AC lines 9–9' disappears. This means is a power-out timer circuit 63 which has a disable input 63a connected by a conductor 61 to the output 57b of pulse shaping means 57 whose input 57a is connected to load terminal 10b of the power triac. The 60 cycle AC voltage always present on this terminal when power is on will be converted to a 60 cycle square wave signal by pulse shaping means 57. When power goes out, the power-out timer 63 becomes operative to produce a "1" stand-by signal at its output 63b for the five minutes or so during which the charge on capacitor 30b of the DC power supply remains at an operating level. This signal is connected by a conductor 61 to the "disable" input 74b of an oscillator 74, and to input 40w of the control circuit 40 (FIG. 4B) which, among other things, renders the power triac 10 control circuit to be described inoperative. These relatively large power drawing circuits are de-energized by this stand-by signal during a 5 minute power stand-by mode of operation of the timer where the markers are retained in memory.

It will be recalled that the control circuit 40 functions in response to the relative spacing between various signals generated by the controls of the timer. For example, the mode of operation of the timer changes to a timer-off mode if the control knob 12 is successively depressed in a time less than 0.8 seconds. Similarly, certain operating modes are automatically changed when "automatic" mode or the "manual program transition" mode is not reached within 5 minutes. To this end, FIG. 4A shows the conductor 54 extending from the output of "OR" gate 52 connecting to input 73i of a timing circuit 73 (FIG. 4B). Also, the conductor 49 extending from the output of the debouncing circuit 48 connects to input 73j of the timing circuit 73. This timing circuit is also the source of various timing pulses, such as a 30 minute pulse which occurs every 30 minutes. This 30 minute pulse appears at an output 73e of the timing circuit 73. The timing circuit 73 also is shown having SST, ST, MT and LT output terminals 73a, 73b, 73c and 73d at which respectively a "0" signal is present when the timing measurement involved is below the time indicated on the lines extending from these output terminals and a "1" signal is present when the timing measurement involved is greater than the time indicated. The manner in which these timing signals operate is shown by FIG. 6A and was described previously in connection with FIGS. 3A and 3B.

In FIG. 4B, the LED indicator 17a is shown connected between ground and the output 84a of an "AND" gate 84 having an input 84c coupled to the output of an inverter 83 whose input is connected by line 61 to the "stand-by" output 63b of the powerout timer 63 so that "AND" gate 84 is closed during "stand-by" operation. (It will be assumed that all "AND" gates operate on the principle that all inputs must have a "1" state signal for there to be a "1" operating output state signal.) The "AND" gate 84 has another input 84b extending to the output 81d of an "OR" gate 81 having inputs 81a, 81b and 81c respectively extending to "flash", "pulse" and "steady-on" outputs 40c, 40d and 40e of the control circuit 40. The signal appearing at the various input terminals 81a, 81b and 81c of "AND" gate 84 will respectively be signals which will produce flashing, pulsing, or a steady-on condition of the LED indicator 17a except during "stand-by" operation.

FIG. 4A shows the shift register 62 as a 48 stage shift register having shift pulse, data input, and reset input terminal 62a, 62b and 62c, respectively. Also, the shift register has a Q48 output terminal 62d (which represents an output of the last 48th stage of the shift register). The output terminal 62d of the shift register 62 is connected by a conductor 67 to the input 69a of a control gate 69 having an output 69b coupled by a conductor 71 to the shift register data input terminal 62b so that the information ultimately stored in the shift register can be re-circulated. The gate 69 is controlled by the "programmed" output 86b of the "1" marker sensing means 80. Accordingly, when the timer is in the "automatic" mode of operation the gate 69 will conduct to permit the re-circulation of the markers within the shift register. However, before the "automatic" mode of operation of the timer is established, the gate 69 will not conduct and the shift register 62 receives signals at its data input terminal 62b from the circuit to be described, to provide "1" or "0" marker setting signals thereat.

The shift register 62 will be assumed to be of a type where a "1" shift pulse will shift a particular "0" or "1" signal at the data input terminal 62b to the output of the first stage of the shift register. The shift pulse input terminal 62a is connected to the output 66a of an "OR" gate 66 which has one input 66c extending to the 30 minute pulse output of the timing circuit 73 so that this pulse is fed to the shift register every 30 minutes in real time when the shift register is to be synchronously shifted. Another input 66b of the "OR" gate 66 extends to the output 51a of an "AND" gate 51 whose input 51a extends to the line 49' extending to the output of the debouncing circuit 48. The "AND" gate 51 has another input 51c which extends to the "pulse enable" output 40h of the control circuit 40 to receive an enable voltage during review and all manual program states except the MPE mode of operation as shown in FIG. 6B, so that the shift register receives pulses from the debouncing circuit 48 except when setting present time.

The "OR" gate 66 has an input 66d extending to the output 70 a of an "AND" gate 70 which effects the rapid feeding of shift pulses (called rapid time advance or RTA pulses) during the resynchronizing of the shift register 62 to be described after the completion of either a review or a manual program mode of operation of the timer. The "AND" gate 70 thus has an input 70c extending to the output 74a of an 80 KHz oscillator 74 which operates except during "stand-by" operation. The "AND" gate 70 has another input 70b coupled by a control line 40g' to an RTA enable output 40g of the control circuit 40 which produces a "1" signal at the transition of the various manual program and review modes of operation back to the "automatic" mode of operation of the timer. The "AND" gate 70 also has an input 70d connected by a conductor 80 to the output of an inverter 78 whose input is connected to the output of an offset counter 64.

The output of "OR" gate 66 also feeds the clock input terminal 64a of the offset counter 64. The offset counter is reset to zero upon the entering of "present time", whereas the shift register 62 is reset during "program reset" of the timer, which it can be seen from FIG. 6A occurs when the timer is operated to the "not programmed" mode of operation. The shift register 62 in a sense is a pulse counter because the first "ON" marker entered into the output of the first stage of the shift register will assume a position in the 48 stages thereof depending upon the number of shift pulses fed thereto since the "ON" marker is fed thereto. It is apparent that the difference in the count in the shift register and offset counter at the time the first "ON" marker is entered into the shift register will be an offset count number equal to the number of half hour intervals which have occurred between "present time" and the time the first "ON" marker is manually set into the shift register (since the shifted position of an ON marker is the count of the shift register referred to).

Furing a time interval when a manual programming is taking place and the "OR" gate 66 receives its pulses from the output of the debouncing circuit 48, this offset will be maintained, and so when the first entered "1" marker reaches the last stage of the shift register 62, the marker in the last stage of the shift register not representing the desired light condition for present time is then shifted to a position where the last stage represents the storage location for present time. This is achieved by rapidly feeding shift pulses to the shift register 62 and to the clock input of the offset counter 67 until the count in the offset counter reaches 48. The sensing of a "1" marker in the last stage of the shift register by "1" marker sensing means 86 feeds a pulse to "pro-grammed" line 86b' which operates the timer into the "automatic" mode. Whenever, the "automatic" mode is entered the RTA enable line 40g' is energized to enable the gate 70 to feed the 80 KHz output to both the shift register and offset counter to advance the markers and count therein until the offset counter reaches its maximum count. This results in a "1" output thereof which disables gate 70. The shift register is similarly resynchronized by the offset counter when the automatic mode of operation is re-established when a review mode of operation is terminated.

When the "1" marker sensing means 86 senses the presence of a "1" marker at the output terminal 62d of the shift register for the first time, the resultant "1" output of the sensing means is inverted by inverter 92 to disable control gate 90 which controls the feeding of marker signals to the shift register. This "1" output is also fed to the input 69c of the control gate 69, whose input is connected to the shift register output 62d and whose output is connected to the data input terminal 62b of the shift register, to enable the re-circulation of the markers in the shift register when the "automatic" mode of operation of the timer is initiated.

It will be recalled that, during a manual programming or review mode of operation where control knob 12 is not rotated to all of the different possible detented positions for feeding markers into the shift register or reading markers from the output of the shift register so that the user does not complete a manual programming or manual review mode of operation, the shift register 62 will be automatically advanced to a point where the first entered "1" ON marker is located at a storage location representing present time by a re-synchronization operation as just described. This means for automatically advancing the markers in the shift register 62 when such manual programming or review mode of operation is not terminated by the user is accomplished by the circuit logic now to be described. Thus, each time the control knob 12 is depressed or advanced one position, the timing circuit 73 is reset for establishing a new timing period for the various time-out periods referred to. If the control knob 12 is not again operated for a period of five minutes during manual programming and 40 seconds during program review, a "1" signal appears on the output 73c of the timing circuit 73. This line extends to the control circuit input 40p of the control circuit 40, which will then generate a "1" signal which returns the timer to the "automatic" mode of operation resulting in the generation of a "1" signal on the "rapid time advance enable" line 40g' leading to gate 70 which opens to feed the 80 KHz pulses to the shift register 62 and offset counter 64, to effect the shifting of the shift register 62 by the re-synchronization operation previously explained.

Now that the description of the simplified block diagram of FIGS. 4A and 4B have been completed, reference will now be made to FIGS. 5A, 5B and 5C, considered as a whole, where a breakdown of the details of some of the control elements shown as single blocks in FIGS. 4A and 4B just described will be expanded to include more details of the same.

FIGS. 5A, 5B and 5C

The timing circuit 73 is shown in FIG. 5C. This circuit receives a 60 cycle square wave output from the Schmidt trigger circuit constituting pulse shaping means 57. This output is coupled by a line 58 to the input 73m of the timing circuit 73 to synchronize the operation of the same. As previously indicated, the timing circuit 73 has a number of sections thereof which produces at the various outputs 73a, 73b and 73c a "1" signal at various time-out periods respectively greater than 0.8 seconds, 40 seconds, and five minutes, and a "0" signal when these sections of the timer are reset before this period is over. The time-out periods occur from a point beginning with either the depression of the control knob 12 or the rotation thereof one detented position. As timing inputs for the timing circuit 73 there are provided connections to "divider reset" and "divider enable" control lines 40a' and 40b'. Divider reset line 40a' extends from the input 40a of the control circuit 40 to the input 73k of the timing circuit. One case where a momentary "1" signal appears on this line is when the timer is charged from the "manual programmed enable" mode to the "manual program not initiated" mode of operation. The "divider enable" control line 40b' extends between the control circuit output 40b and the input 73L of timing circuit 73. Steady "1" signals appear on this line at the various times identified in the table of FIG. 6B.

The timing circuit includes a cascaded series of dividers 73-1, 73-3, 73-5, 73-7 and 73-11 where the output of one divider feeds the input of the next divider to provide a variety of different time-out periods beginning with the simultaneous resetting of all of the same when a reset pulse appears on "divider reset" line extending from the logic matrix 41 to the control circuit output 40a and then to timing circuit terminal 73k, in turn, connected to the reset inputs 73-1b, 73-3b, ... 73-11b of these divider circuits. The pulse input 73-1a to the first divider 73-1 thereof is shown connected by lines 73m and 48' to the 60 Hz square wave output of Schmidt trigger circuit 57. The outputs of the divider circuits 73-1, 73-3, 73-5 and 73-7 respectively extend to the inputs 73-13a, 73-15a and 73-17a of "NOR" gate 73-13, 73-15 and 73-17. The outputs of these "NOR" gates extend respectively to the clock inputs 73-19a, 73-21a and 73-23a of divider circuits 73-19, 73-21 and 73-23. The outputs of these latter divider circuits are connected by feed-back conductors 73-25, 73-27 and 73-29, respectively, to the inputs 73-13b, 73-15 and 73-17b of the "NOR" gates 73-13, 73-15 and 73-17. The divider circuits 73-19, 73-21 and 73-23 have "reset" input terminals fed from a common reset line 73-31 extending from the output of an "OR" gate 73-33. The inputs 73-33a and 73-33b of the "OR" gate 73-33 respectively are connected to the lines 54 and 49 respectively extending to the output of the "OR" gate 52 and the output of debouncing circuit 48 so that these lines receive pulses each time the control knob 12 is either depressed or detented one position.

The various divider circuits 73-19, 73-21 and 73-23 are pulse counting circuits which receive pulses at their clock inputs which will not result in full counts of the divider circuits if control knob 12 is depressed or rotated in succession at time intervals less than the various time-out periods involved so that under these circumstances the outputs thereof will never reach a "1" state. Conversely, the outputs of these divider circuits will reach a "1" state at the timing periods involved if the periods between successive depressions or rotations of the control knob 12 is greater than the particular time-out periods involved because then the feedback circuits to the inputs of the "NOR" gates 73-13, 73-15 and 73-17 will cause the count cycle to be terminated when the divider outputs reach the full count "1" state. The time-out circuit just described provides the super short time (SST), short time (ST) and medium time (MT) timing periods previously described and identified in appropriate columns of the table of FIG. 6A.

The time-out operations for producing the LT play period of 30 minutes and the regular 30 minute pulses will now be described. This circuit includes an "AND" gate 73-9 having an input 73-9a connected to the output of the divider 73-7 and an input 73-9b connected by control lines 71' extending to the timer input 73L, in turn, connected by control lines 40b' extending to the "divider enable" control circuit output 40b. As shown in the table of FIG. 6B, a divider enable output of the logic matrix 41 occurs at that time shown in the flow diagram of FIGS. 2A and 2B when a 30 minute time-out period is desired. When the 30 minute pulse is needed for timing purposes, the "AND" gate 73-9 will then be enabled by the "divider enable" signals so that the output of the divider 73-11 will produce one pulse every 30 minutes fed to the timer circuit output 73e.

To produce the single 30 minute "play" period pulse, the first 30 minute pulse becomes effective as it is fed to the set input 73-36a of a set-reset bistable circuit 73-36 to set the same. The reset input 73-36b of set-reset bistable 73-36 is connected by a line 73-38 to the output of the power on-to-off sensing circuit 55 shown in detail in FIG. 5C, which produces a momentary pulse when power is first applied to the timer. It is thus apparent that the set-reset bistable circuit will produce a "1" output only after the first 30 minute "play" period described, and will not regenerate this signal until a power interrupting operation takes place.

Reference should now be made to the power off-to-on sensing circuit 55 in FIG. 5C. This circuit includes a pair of rectifiers 55-1 and 55-2 connected in series between the positive output of the DC power supply 30 and the ungrounded terminal of a resistor 55-3 whose other terminal is grounded. The juncture between the rectifier 55-2 and the resistor 55-3 is connected to the input of an inverter 55-4 whose output is connected to the "set" input of a set-reset bistable circuit 55-5. The "reset" input of this bistable is connected by a conductor 73h' to the 2 pps. output 73h of the timing circuit 73.

When the timer condition setting control arm 15 is moved from the "OFF/CLEAR" to the "ON" position, the timer is powered up for the first time. The output of the DC power supply capacitor 30b will then charge up to its maximum voltage of 4 volts. Before this voltage has reached a value where the rectifiers 55-1 and 55-2 start conducting, the input to an inverter 55-4 will be a "0" signal to produce a "1" state in the output thereof which will set the set-reset bistable 55-5 to provide a "1" signal at set-reset bistable output 55b. When the voltage across DC power supply capacitor 30b reaches a value where the rectifiers 55-1 and 55-2 conduct, the voltage drop appearing then across the resistor 55-3 generates a "0" state signal in the output of inverter 55-4 so that the next reset pulse fed to the "reset" input of the bistable 55-5 will reset the same. Since no further voltage occurs in the input circuit to the bistable, it remains in a reset state until power is again disconnected from the timer system.

The power-out timer circuit 63 which produces a "stand-by" signal which de-energizes different parts of the circuit during a loss of power to the timer is shown in detail in FIG. 5A. As there shown, the circuit includes a divide by 4096 divider circuit 63-1 having a "reset" input 63-1a connected to the output of a positive or negative edge one-shot multivibrator 63-2 whose input is connected by the aforementioned conductor 61 to the square wave output of the Schmidt trigger circuit 57. The divider circuit 63-1 has a clock input 63-1b connected to the output of a "NOR" gate 63-3 having one input 63-3b connected to the output of the 80 KHz oscillator 74 and an input 63-3c connected to the output of the divider circuit 63-1 so that when 4096 pulses from the oscillator are fed thereto and counted thereby, a "1" signal appears in the divider circuit output which is converted to a steady "0" signal at the "NOR" gate output which holds the clock input at ground potential, preventing further response to pulses fed thereto.

Before any loss of power to the timer, the repeated 60 Hz pulses fed to the reset input 63-1a prevents the divider circuit from counting 4096. Upon loss of power to the timer, the reset pulses disappear so the divider circuit receives 4096 pulses and locks-up with a steady "1" signal in the output thereof. This "1" signal produces a "stand-by" signal which is fed to the disable input of the 80 KHz oscillator 74 to turn the same off and is fed to other parts of the timer system to disable the same as previously described, except for the shift register 62 and associated circuits which maintain the markers therein.

Reference should now be made to the voltage change pulse circuit 58 shown in FIG. 5A, which is the circuit which produces a positive pulse each time the 3-way switch wiper 25c is moved between contacts 25a and 25b. It will be recalled that the voltage appearing on the stationary contact 25a which extends to the input 58a of the voltage change pulser circuit 58 will be a 60 Hz voltage when the wiper 25c engages the same and no voltage when the wiper is disconnected therefrom. The input 58a of the circuit is connected to one end of a series circuit comprising resistors 58-1 and 58-2 whose other end is grounded. A capacitor 58-3 is shown connected across the resistor 58-2. A 60 Hz voltage applied to the input 58a of the circuit 58 will produce a similar waveform voltage across the resistor 58-2 which voltage is fed to the reset input of a divider circuit 58-5 to prevent the circuit from responding to any pulses fed thereto. The output of the divider circuit 58-5 then remains in a "0" state. The divider circuit 58-5 has a clock input extending to the output of a "NOR" gate 58-7 having one of its inputs 58-7a connected to the line 61 extending to the 60 pps output of the Schmidt trigger circuit 57. If the divider circuit 58-5 is not reset because the 3-way switch wiper 25c is moved to contact 25a, the divider circuit will count the pulses fed to the clock input thereto, and when a count of 4 is reached the signal on the output 58-5 thereof will change from a "0" to a "1" signal condition. This "1" signal condition is fed back by a conductor 58-6 to a second input 58-7b of the "NOR" gate 58-7 which will then provide a steady "0" signal condition at the output thereof to prevent an further count pulses from entering the divider. This charge in a positive direction from a "0" to "1" signal condition at the output of the divider circuit 58-5 is converted to a single positive pulse by a positive edge one-shot multivibrator 58-8 the input of which is connected to the divider circuit output. The output of this positive edge one-shot multivibrator 58-8 is connected to an "OR" gate 58-10, whose output is connected through the output 58b of the circuit 58 to the input 52b of the "OR" gate 52 which feeds the common line 54 which also receives the pulses resulting from the depression of the control knob 12.

When the signal output condition of the divider circuit is initially in a locked-in "1" state, it is switched to a "0" state by the re-appearance of a 60 Hz input from the 3-way switch 25 when wiper 25c is moved to contact 25a. This resets and changes the "1" input of the divider circuit back to an "0" state. This output change is converted to a positive pulse by a negative edge one-shot multivibrator 58-8', whose input is connected to the divider circuit output. This positive output pulse of the negative edge one-shot multivibrator 58-8' is connected to said "OR" gate 58-10 which feeds this positive pulse to the line 54 through "OR" gate 52.

FIG. 5A shows the control terminal 10c of the power triac 10 coupled by conductor 100 to the on-off control line 40t' connected to output 40t of the control circuit 40. The output 40t of the control circuit 40 is connected to the output 102a of a set-reset bistable 102 (FIG. 5B) having a set input 102b extending to the output of a negative edge one-shot multivibrator 104, and a reset input terminal 102c extending to the output of an "OR" gate 106. The bistable output 102a has a "1" power triac turn-on signal when the bistable is set and a "0" power triac turn-off signal when the bistable is reset.

The "OR" gate 106 has an input 106a extending to the "standby" output of the power-out timer 63 which feeds a continuous "1" reset signal to the reset terminal 102c of the set-reset bistable 102 when power is out so that set-reset bistable remains continuously in a reset condition, which assures that the power triac 10 remains non-conductive. The "OR" gate 106 has another input 106b extending to the Q' output of a toggle bistable circuit 108 which is alternately operated between set and reset conditions by the feeding of successive "1" signals to toggle bistable input 108c. When the toggle bistable 108 is reset, the Q' output thereof will have a "1" signal thereon and when this bistable is set, the Q' output thereof will have a "0" signal thereon, which will then permit the set-reset bistable 102 to be set. The input 104b of negative edge one-shot multivibrator 104 is connected to the "zero crossing signal" input 40g of control circuit 40. This terminal is connected by an input line 40g' to the juncture of DC power supply rectifier 30a and resistor 30c. When the triac 10 is initially non-conductive, the voltage at the juncture of rectifier 30 and resistor 30c relative to ground will be the positive output of the power supply. In a cycle of the applied AC voltage on power line 9', when the voltage thereof begins to increase from 0 in a positive direction, the voltage on the non-conducting triac load terminal 10b will also increase in the same direction, and this positive-going voltage is coupled through the power supply control means 30d to charge or maintain the charge on the capacitor 30b, and rectifier 30a will then become conductive. Conduction of rectifier 30a applies ground to the first previously positive control line 40g' connected to the previously ungrounded side of capacitor 30b. This negative-going voltage produced at the beginning of a positive-going half cycle of the voltage or power line 9' when triac 10 is non-conductive is fed by line 40g' to the input of the negative edge one-shot multivibrator 104, to produce a "1" signal at the output 104a thereof, which sets the set-reset bistable 102. Thereafter, the power triac is rendered conductive each half cycle of the applied AC voltage starting a few degrees after the applied AC voltage passes through zero and ending when the current flow therethrough drops below a holding current value near zero.

The "OR" gate 112 has an input 112a extending to the output 110c of a positive edge one-shot multivibrator 110, and an input 112a' extending to the output 110c' of a negative edge one-shot multivibrator 110'. The one-shot multivibrators 110 and 110' have inputs 110a and 110a' fed from a common input line 40m' extending through the control circuit input 40m and conductor 67 to the output 62d of the shift register 62. Thus, whenever the output condition of the last stage of the shift register changes from an "0" to "1" signal state, the positive edge one-shot multivibrator will produce a positive pulse, if this circuit is enabled to operate, and whenever the output condition of the last stage of the shift register 62 changes from a "1" to a "0" state, the negative edge one-shot multivibrator 110' will produce a positive pulse when this circuit is enabled to operate. The outputs of the one-shot multivibrators 110 and 110' will then appear at the output of the "OR" gate 112 to toggle the toggle bistable 108 as long as these one-shot multivibrators are enable to operate. The one-shot multivibrator 110 and 110' have enable input terminals 110b and 110b' respectively extending to the outputs of "AND" gates 111 and 111' having inputs 111a and 111a' connected by a common conductor to the "Auto" output of the logic matrix 41. From the table of FIG. 6B, it will be noted that a steady "1" signal will appear at this "Auto" output when the timer is operated in an "automatic" mode of operation. The other input 111b of "AND" gate 111 is connected to the Q' output of the toggle bistable 108 and the other output 111b' of the "AND" gate 111' is connected to the Q output of the toggle bistable 108. It is thus apparent that the positive edge one-shot multivibrator 110 will be enabled to operate when the Q' output of the toggle bistable 108 is in a "1" state, which occurs when the power triac is nonconductive. Similarly, the negative edge one-shot multivibrator 110' is enable for operation when the power triac is conductive. With this circuit logic, each transition in the output of the shift register 62 will result in a reversal of the state of operation of the power triac 10, except when the circuit had been previously overridden by the depression of the control knob 12 which independently toggles the bistable 108 as previously explained. The operation of the toggle bistable 108 overridden by the depression of the control knob will automatically be re-established in the subsequent transition of the output of the shift register which can be effective to change the operative stage of the power triac 10.

The "OR" gate 112 has an input 112c extending to the output of "AND" gate 114 having one input 114a extending to the "pushbutton" line 54' which has a "1" signal thereon momentarily as the control knob 12 is depressed. The other input 114b of "AND" gate 114 extends to the "pushbutton enable" output of the logic matrix 41. As shown in FIG. 6B, this line has a continuous "1" signal thereon, except when the timer is in a "manual program enable" or a "review enable" mode of operation so that except for these modes of operation of the timer, each time the control knob 12 is operated, it will develop a "1" signal at the output of the "AND" gate 114 which is fed through the "OR" gate 112 to toggle the toggle bistable 108 to turn the triac 10 on or off.

To this end, "AND" gates 117 and 117' have inputs 117a and 117a' connected to the "load light bistable" output of the logic matrix 41 which, as can be seen from table 6A, produces a momentary "1" signal when the timer is returned to an "automatic" mode of operation.

The "AND" gate 117 has input 117b connected to the output of an inverter 113 whose input is connected to the control circuit input 40m by control line 67 to the output 62b of the shift register 62. The "AND" gate 117' has an input 117b' connected to the control circuit input 40m connected by line 67 to the output 62b of the shift register 62. It can now be seen that the logic of the connections to the "AND" gates 117 and 117' is such as to produce a momentary "1" signal upon the return of the timer to an automatic mode of operation when the marker in the last stage of the shift register does not correspond to the conductive state of the triac or the proper output condition of the toggle bistable 108 which enables the proper multivibrator 110 or 110' to respond to the next transition of the shift register output from a "0" to "1" or from a "1" to a "0" state.

The only other circuit details shown in FIGS. 5A, 5B and 5C which have not already been described are the "AND" gates 120 and 122 in FIG. 5B which control the feeding of the LED indicator control signals appearing on the "pulse" and "flash" terminals 40d and 40c of the control circuit 40. Thus, "AND" gate 120 has one input 120a connected to the "pulse" terminal 40j which receives a pulse each time the control knob 12 is rotated and an input 120b connected to the "LED pulse" output of the logic matrix 41. The table in FIG. 6B indicates the instances when a continuous LED pulse enable signal is generated.

The "AND" gate 122 has an input 122a extending to the "LED flash" output of the logic matrix which, as shown by Table 6B produces a steady "1" signal when the timer is in a "not programmed" or "manual program enable" mode of operation. The "AND" gate 122 has another input 122b extending to the 4 pps line extending from the timer circuit 73.

FIG. 5B shows the logic matrix 41 as a single block. To avoid a needless encumbrance of this specification and drawings, the details of all of various logic circuit elements forming out of the matrix are not shown. However, these elements are adequately identified by the control means boxes in the flow diagram of FIG. 2, as well as the logic matrix operation tables of FIGS. 6A and 6B which identify all of the various input and output signals to and from the logic matrix as well as the state detecting and state transition operations performed by the logic matrix.

It should be apparent that the present invention is an exceedingly unique, "people oriented" timer system which simplifies the operation of the timer, especially the programming and program review thereof.

It should be understood that numerous modifications may be made in the most preferred form of the invention described without deviating from the boarder aspects thereof.

We claim:

1. In a programmable timer comprising storage means having respective storage locations assigned to various time intervals over a twenty-four hour period and in which storage locations there can be stored turn-on or turn-off markers which are operable to control the condition of a given controlled means, the improvement comprising: manually operable time setting means operable to positions representing various time settings establishing initially a "present time" setting and then time settings defining the beginning of said various time intervals, manually operable marker signal generating means operable to ON and OFF marker signal generating conditions, manually operable timer condition setting means operable to timer de-energizing and timer-on conditions, means responsive to the initial setting of said manually operable time setting means to a "present time" setting and the subsequent operation of said manually operable marker signal generating means which generates a present time entering signal for initiating a manual programming mode of operation of the timer, means subsequently responsive to the operation of said manually operable time setting to the various time settings and the operation of said marker signal generating means when said timer condition setting means is in said timer-on condition for entering or retaining ON and OFF markers in the storage locations corresponding to the time intervals identified by the time settings of said manually operable time setting means, and means responsive to the completion of the entry or retention of ON and OFF markers in all of the storage locations of said storage means for operating the timer in an automatic mode of operation where said storage locations are synchronously accessed and the markers in the accessed storage location control the condition of operation of said controlled means.

2. The timer of claim 1 provided with indicator means, and indicator control means for establishing a first distinctive indication on said indicator means which identifies a notprogrammed condition of the timer when said timer condition setting means is initially operated to said timer-on condition, a second distinctive indication indicating that the timer is being programmed, and a third distinctive indication indicating that the timer is programmed and in said automatic mode of operation.

3. The power circuit controlling timer of claim 2 wherein said first distinctive indication is a flashing indication, said second distinctive indication is the absence of any distinctive indication differing from that appearing during a de-energized state of the timer and said third distinctive indication is a steady-on indication.

4. The timer of claim 1 further provided with mode modifying means responsive to the automatic mode of operation of the timer and to the subsequent operation of said manually operable time setting means to present time and to the operation of said manually operable marker signal generating means to enter said present time for disabling said synchronous storage location accessing means, establishing a review mode of operation of the timer accessing the storage locations identified by the time settings of said manually operable time setting means and operating the power switch means into the condition corresponding to the marker in the accessed storage location, and means for returning said timer from said review mode of operation to said automatic mode of operation.

5. The timer of claim 4 wherein said last mentioned means is means responsive to the next operation of said manually operable marker signal generating means.

6. The timer of claim 4 wherein said last mentioned means is a manually operable means.

7. The timer of claim 4 wherein there is provided additional means which automatically returns the timer from a review mode of operation to said automatic mode of operation if said returning means is not operated within a given time period.

8. The timer of claim 1 wherein there is provided means responsive during the manual programming mode of operation of the timer where there has been set at least one ON marker in a storage location and there has been set or retained at least one OFF marker in another storage location of said storage means but said manually operable time setting means has not been set to all the possible time settings thereof starting with the first ON marker setting to complete a manual programming operation for automatically completing the setting of OFF markers in the remaining unset storage locations of said storage means, to automatically complete a manual mode of operation and for then automatically returning the timer to said automatic mode of operation.

9. The timer of claim 4 wherein there is provided means responsive to the completion of the setting of said manually operable time setting means to all of the possible time settings thereof starting with the first ON marker setting for establishing a pre-automatic mode of operation of the timer for a very short time interval before said return to said automatic mode of operation, to permit said time setting means to be moved quickly through and beyond the last time setting without shifting the timer into said review mode of operation as a result of the further operation of said manually operable setting means.

10. In a programmable timer system comprising storage means having respective storage locations assigned to various time intervals over a twenty-four hour period and in which storage locations there can be stored turn-on or turn-off markers which are operable to control the condition of a controlled means, the improvement comprising: a rotatable and depressible control member rotatable to discrete positions representing various time settings establishing initially a "present time" setting and then time settings defining the beginning of said various time intervals, permanently visible time setting indicating indicia along said rotatable member, and indexing means for identifying the time setting for each discrete position of said manually rotatable control member, a timer condition setting member movable between timer-off and timer-on positions, means responsive to the initial rotation of said manually rotatable member to a "present time" setting and the subsequent depression of said rotatable member which generates a present time entering signal for initiating a manual program mode of operation of the timer, means subsequently responsive to the rotation of said rotatable member to various time settings and the depression of said manually rotatable member when said timer condition setting member is in said timer-on position for alternately entering or retaining ON and OFF markers in the storage locations corresponding to the time intervals identified by the time settings of said manually rotatable member, and means responsive to the completion of the entry or retention of ON and OFF markers in all of the storage locations of said storage means for operating the timer in an automatic mode of operation where said storage locations are synchronously accessed and the markers in the accessed storage location control the condition of operation of said controlled means.

11. The timer system of claim 10 provided with indication means, and indicator control means for establishing a first distinctive indication on said indicator means which identifies a not-programmed condition of the timer when said timer condition setting means is initially operated to said timer-on condition, a second distinctive indication indicating that the timer is being programmed, and a third distinctive indication indicating that the timer is programmed and in said automatic mode of operation.

12. The timer system of claim 10 wherein said first distinctive indication is a flashing indication, said second distinctive indication is the absence of an indication and said third distinctive indication is a steady-on indication.

13. In a programmable timer for controlling a given controllable means in accordance with ON and OFF markers from storage locations of a marker storage means, such storage locations being assigned to the various controllable time intervals, synchronous storage location accessing means for accessing such storage locations at the beginning of such time intervals after the timer has been programmed by inserting the various markers within said storage locations for said various time intervals, means for programming said timer by setting said markers within said storage locations, said programming means including manually operable marker signal generating means settable to on-marker and off-marker signal generating conditions, and manually operable present and subsequent time setting means settable in discrete steps first to a present time setting and then to subsequent time settings defining the beginning of time interval conditions corresponding to said various time intervals, the improvement comprising: control means for establishing an initial not-programmed first mode of operation of the timer; indicator means and means responsive to said not-programmed mode of operation for providing a first distinctive indication on said indicator means indicating such mode of operation; control means responsive to the operation of said time setting means to said present time condition when the timer is in said not-programmed mode of operation and to the first operation of said manually operable marker signal generating means for establishing a manual programming mode of operation of the timer and to generate a present time entering signal without resulting in the setting of any markers in said storage means, said first distinctive indication then disappearing from said indicator means; control means responsive after generation of said present time entering signal to the second operation of said manually operable marker signal generating means for setting a first ON marker in the storage location of said storage means determined by the setting of said time setting means and then upon subsequent operation of said time setting means to other time settings defining the beginning of a first OFF time interval for entering additional ON markers in the corresponding storage locations of the storage means; control means responsive to the next operation of said manually operable marker signal generating means for setting or retaining an OFF marker in the storage locations of said storage means for the time intervals identified by the time setting of said manually operable time setting means and then upon subsequent operation of said time setting means to other time settings defining the beginning of a next ON interval for entering additional OFF markers in the corresponding storage locations of the storage means; control means responsive to any further similar operation of said manually operable time setting and marker signal generating means for repeating said ON and OFF marker setting or retaining operations for the storage locations of said storage means corresponding to the time interval settings involved; control means responsive to the completion of the setting or retention of said ON and OFF markers in all of the storage locations of said storage means for automatically establishing an automatic mode of operation of the timer when said synchronous storage location accessing means becomes operative so that the markers in the storage means synchronously control automatically the operation of said controlled means; and control means responsive to the automatic mode of operation of the timer for operating said indicator means to distinctly indicate said automatic mode of operation of the timer.

14. The timer of claim 13 further provided with resetting means for removing the markers in said storage means and returning the mode of operation of the timer from said automatic mode to said not-programmed mode of operation.

15. The timer of claim 1 or 28 wherein said storage means in said automatic mode of operation is a continuously synchronously circulating shift register and has a number of stages therein equal to the number of said time intervals in a twenty-four hour period, a data input terminal for receiving ON and OFF marker signals initiated by operation of said marker signal generating means, a shift pulse input terminal which receives synchronous shift pulses during said automatic mode of operation of the timer and shift pulses generated by the operation of said time setting means during the manual programming mode of operation of the timer, said storage locations assigned to a particular time interval and the markers therein being shifted one stage at a time as a shift pulse is fed to said shift pulse input terminal, said ON and OFF markers being set or retained in the first stage of the shift register; the timer being further provided with an offset counter which receives said shift register shift pulses to count the same and produce a control signal after each successive group of N shift pulses are fed to the offset counter after the same is reset, N being a number equal to the number of said time intervals in a twenty-four hour period; means for resetting said offset counter when "present time" is entered by said operation of said manually operable marker signal generating means; means for removing any markers in said shift register prior to the beginning of said manual programming mode of operation means responsive during manual programming to the shifting of the first set ON marker to the last stage of the shift register for returning the timer to said automatic mode of operation; and means responsive to the transition of the timer from said manual programming mode of operation to said automatic mode of operation for rapidly feeding shift pulses to said offset counter and to said shift register only until said offset counter reaches a maximum count of N shift pulses.

16. The timer of claim 13 wherein there is provided means measuring a given time period after the entry of present time and beginning with the subsequent operation of said manually operable time setting means or marker signal generating means while the timer is in a manual programming mode of operation and until one ON and one OFF marker has been set or retained in said storage means, and for returning the timer to said not-programmed mode of operation if at least one ON and one OFF marker have not been so set or retained by the end of such time period.

17. The timer of claim 1, 10 or 13 including timing means for automatically setting the mode of operation of said timer to said automatic mode of operation a given time period after the first ON and OFF markers have been set or retained in said storage means, if said markers were not otherwise set or retained in the remaining unaccessed storage location.

18. In a programmable timer under control of turn-on and turn-off markers in storage locations of marker storage means, which storage locations are assigned to the various time intervals during which the power switch means may be in either of said conditions; synchronous storage location accessing means for accessing such storage locations at the beginning of said time intervals; and programming means including manually operable turn-on and turn-off marker signal generating means for setting or retaining said marker in said storage locations, the improvement comprising means responsive to the presence of at least one complementary pair of ON and OFF markers in the storage locations of said storage means so that at least one predetermined ON period is defined by the markers in said storage means for switching the mode of operation of the timer to an automatic mode of operation where said synchronous storage location accessing means accesses the markers stored in said storage means to control said switch means in accordance therewith; and means responsive to the absence of at least one complementary pair of ON and OFF markers in the storage locations of the storage within a predetermined time period for alerting the user that the timer has not been programmed by the entry of said at least one pair of complementary pair of ON and OFF markers.

19. The timer of claim 18 wherein there is provided means responsive to the operation of the timer to said automatic mode of operation for providing the user with an indication of such fact.

20. The timer of claim 1, 10 or 18 wherein there is provided manually operable review mode entry and cancelling means for switching the mode of the timer selectively into a review mode of operation from said automatic mode of operation or from said review mode of operation back to said automatic mode of operation; means responsive to the operation of said timer to said review mode of operation for responding to the operation of manually operable time setting means for identifying the particular markers stored in the storage location of said storage means for the time intervals identified by the time settings involved; and timing means responsive to the failure of the user to operate said manually operable review mode cancelling means within a given time period for automatically returning the timer to said automatic mode of operation thereof.

21. The timer of claim 1 wherein there is provided means responsive in the automatic mode of operation of the timer and to the first operation of said manually operable time setting means to present time and first operation of said marker signal generating means for operating the timer in a review mode of operation for identifying the particular markers stored in the storage location of said storage means for the time intervals identified by the subsequent time settings of said time setting means; means responsive to the next operation of said marker signal generating means for returning the timer to said automatic mode of operation; and timing means responsive to the failure of the user to operate said manually operable marker signal generating means to return the timer to an automatic mode of operation within a given time period for automatically returning the timer to said automatic mode of operation thereof.

22. In a programmable timer for controlling the operation of a controlled means, said timer including storage means having respective storage locations assigned to various time intervals where switch means turn-on or turn-off markers can be stored or retained to control said switch means, manually operable programming means for setting or retaining said turn-on and turn-off markers in storage locations corresponding to the desired time intervals involved, and means following the completion of the setting or retention of said markers in all of said storage locations for operating the timer in an automatic mode where the storage locations are automatically and synchronously accessed to control the operation of said controlled means in accordance with said markers, the improvement comprising automatic programming completion means which, upon the failure of the user to set or retain turn-on or turn-off markers in all of the storage locations of said storage means after a given time period, automatically sets turn-off markers in the remaining storage locations of said storage means and automatically operates the timer in said automatic mode of operation where said controlled means is controlled by the markers in said storage locations of the storage means assigned to the time intervals involved.

23. In a programmable timer for controlling the operation of a controlled means, said timer including storage means having respective storage locations assigned to various time intervals where ON or OFF markers can be stored or retained to control said controlled means, manually operable programming means including time setting and marker setting means for setting or retaining said turn-on and turn-off markers in storage locations corresponding to the desired time intervals involved, and means following the completion of the setting or retention of said markers in all of said storage locations for operating the timer in an automatic mode where the storage locations are automatically and synchronously accessed to control the operation of said controlled means in accordance with said markers, the improvement wherein there is provided user operable mode changing means for changing the timer from said automatic mode of operation to a review mode of operation where said markers in said storage locations in said storage means are identified upon further operation of said time setting means and for returning the timer to said automatic mode of operation by operation of a manually operable means, and means responsive to the failure of the user within a given time to return said timer to said automatic mode of operation for automatically doing so thereafter.

24. In a timer system comprising timer power input terminal means; storage means having respective storage locations assigned to various time intervals during which a controlled means can be operated to either one of at least two possible conditions and in which storage locations there are stored switch ON or OFF markers; first control means including repeat cycle synchronous storage location accessing and marker readout means for continuously accessing said storage location and feeding control signals to said controlled means in accordance with the markers in the accessed storage locations; and DC power supply means coupled to said timer power input terminal means and including energy storage means for storing up energy therefrom and providing at output DC terminal means thereof a DC voltage for energizing the various portions of said timer including said storage means and said first control means, the improvement comprising means enabling said energy storage means to maintain for a given duration a sufficient output of DC voltage to maintain the markers in said storage means if there is no drain on said DC power supply means from said first control means; means responsive to the loss of power at said timer power input terminal means by de-energizing said first control means but continuing the connection of said DC power supply means to said storage means so that the markers are maintained in said storage means while there is minimum power drain on said DC power supply means.

25. In a timer comprising power input terminal means; storage means having respective storage locations assigned to various time intervals over a twenty-four hour period during which intervals a controlled means can be operated to either one of at least two possible conditions and in which storage locations there can be stored ON or OFF markers which are operable to control the condition of said controlled means, the improvement comprising: programming means for placing said markers in said storage locations; indicator means which is energized where said storage means has said markers therein; first control means responsive to the markers in said storage location for operating said controlled means; DC power supply means energizing said indicator means and first control means and energized by connections to said power input terminal means so that energizing power for said DC power supply means is obtained from the source of power for normally energizing said timer, said DC power supply means including a storage capacitor and rectifier means for charging the capacitor from the power obtained through said power input terminals means; the improvement comprising: means responsive immediately to the loss of energizing power for said DC power supply means for automatically rendering said first control means and indicator means inoperative to reduce the drain on said capacitor, but leaving said storage means operative to maintain said markers in said storage means, the capacitor being capable of retaining a sufficient charge for at least a few minutes to operate said storage means when said indicator means and first control means are rendered inoperative.

26. The timer of claim 24 or 25 provided with means responsive to a prolonged power failure when said markers in said storage means become lost and to the re-establishment of power to said DC power supply means for providing an indication that the markers have been lost from said storage means so that the user is aware of the fact that the timer must be re-programmed.

27. In a power circuit controlling timer for operating power switch means to power circuit closing and opening conditions a manually operable power turn-on and turn-off means operable successively to power on and power off conditions which normally operate said power switch means to said power circuit closing and opening condition; manually operable timer condition setting means settable to at least timer-on and reset conditions; storage means having respective storage locations assigned to various time intervals over a twenty-four hour period and in which power turn-on and turn-off markers can be respectively stored or retained; programming means for generating signals which set or maintain said turn-on and turn-off markers in selected ones of the storage locations of said storage means; and means responsive to the setting of said timer condition setting means to said timer-on condition setting, and the operation of said programming means to set said markers in said storage locations to effect the automatic mode of operation of the timer where said power switch means is operated to said power circuit closing and opening conditions in accordance with the markers in the storage locations of said storage means; the improvement comprising means responsive to a distinctive operation of said manually operable power turn-on and turn-off means which is different from the manner in which it is operated for normally operating said power switch means for operating the timer in a timer-off mode of operation where the manually operable turn-on and turn-off means subsequently only control said power switch means, said means being responsive to a second distinctive operation of said manually operable power turn-on and turn-off means for returning said timer to said automatic mode of operation.

28. A programmable electric timer including storage means having respective storage locations assigned to various time intervals where ON or OFF markers can be stored or retained to control a controlled means, manually operable programming means for setting or retaining said ON and OFF markers in storage locations corresponding to the time intervals involved, said manually operable programming means including a time setting member operable first to a "present time" setting and then to other time settings defining the beginnings of said various time intervals, and manually operable marker setting means for selectively setting or retaining an ON or OFF marker in a storage location identified by said other time settings of time setting means, and control means responsive only to the next operation of said marker setting means after said time setting means is set to "present time" for operating the timer in a manual programming mode of operation where said markers subsequently will be stored in said storage locations of such storage means in accordance with the subsequent operation of said marker setting means and the storage locations identified by said subsequent settings of said time setting means.

29. The timer of claim 4 or where said storage means in said automatic mode of operation is a continuously synchronously circulating shift register and has a number of stages therein equal to the number of said time intervals in a twenty-four hour period, a data input terminal for receiving ON and OFF marker signals initiated by operation of said marker signal generating means, a shift pulse input terminal which receives synchronous shift pulses during said automatic mode operation of the timer and shift pulses generated by the operation of said time setting means during the manual programming and program review modes of operation of the timer, said storage locations assigned to a particular time interval and the markers therein being shifted one stage at a time as a shift pulse is fed to said shift pulse input terminal, said ON and OFF markers being set or retained in the first stage of the shift register; the timer being further provided with an offset counter which receives said shift register shift pulses to count the same and produce a control signal after each successive group of N shift pulses are fed to the offset counter after the same is reset, N being a number equal to the number of said time intervals in a twenty-four hour period; means for resetting said offset counter when "present time" is entered by said first operation of said manually operable marker signal generating means; means for removing any markers in said shift register prior to the beginning of said manual programming mode of operation; means responsive during manual programming to the shifting of the first set ON marker to the last stage of the shift register for returning the timer to said automatic mode of operation; and means responsive to the transition of the timer from said manual programming and review modes of operation to said automatic mode of operation for rapidly feeding shift pulses to said offset counter and to said shift register only until said offset counter reaches a maximum count of N shift pulses.

30. In a programmable timer for operating switch means to circuit opening and closing conditions under control of ON and OFF markers in storage locations of marker storage means, which storage locations are assigned to the various time intervals during which the power switch means may be in either of said conditions; said timer including synchronous storage location accessing means for accessing such storage locations at the beginning of said time intervals; manually operable ON and OFF signal generating means for generating ON and OFF marker signals; and manually operable time setting means operable first to present time and then to other time settings, the other time settings defining the beginnings of said time manually operable programming means including time setting and marker setting means for setting or retaining said turn-on and turn-off markers in storage locations corresponding to the desired time intervals involved, and means following the completion of the setting or retention of said markers in all of said storage locations for operating the timer in an automatic mode where the storage locations are automatically and synchronously accessed to control the operation of said controlled means in accordance with said markers, the improvement wherein there is provided mode changing means for changing the timer between said automatic mode of operation and timer-off mode of operation where said markers do not control the operation of said switch means, and said manually operable marker setting means is operable selectively in at least a first manner or a second manner, said timer including control means responsive to the operation of said marker setting means in said first manner for entering during initial programming ON and OFF markers in said storage locations of said storage means determined by said time setting means and for operating said switch means between said circuit opening and closing conditions at least when the timer is operating in said timer-off mode, and said mode changing means including means responsive to each operation of said marker setting means in said other manner for switching the mode of operation of the timer between said automatic and timer-off modes of operation.

31. The timer of claim 23 wherein said manually operable programming means includes manually rotatable time setting and depressible marker setting means, the depressible marker setting means being outwardly spring urged and thus momentarily depressible, said user operable mode changing means including means responsive to the rotation and depression of said rotatable and depressible means to operate the timer between said automatic and review modes of operation and where the position of said rotatable means determines the storage location accessed to determine the marker set therein.

32. In a programmable timer including storage means having respective storage locations assigned to various time intervals where ON and OFF markers can be stored or retained to control a controlled means between at least two conditions, manually operable programming means including time setting and marker setting means for setting or retaining said turn-on and turn-off markers in storage locations corresponding to the desired time intervals set by said time setting means, and means following the completion of the setting or retention of said markers in all of said storage locations for operating the timer in an automatic mode where the storage locations are automatically and synchronously accessed to control the operation of said controlled means in accordance with said markers, the improvement wherein there is provided mode changing means for changing the timer between said automatic mode of operation and a timer-off mode of operation where said markers do not control the operation of said controlled means, and said manually operable marker setting means is operable selectively in at least a first manner or a second manner, said timer including control means responsive to the initial operation of said marker setting means in said first manner by entering during initial programming ON and OFF markers in said storage locations of said storage means determined by the settings of said time setting means, and said mode changing means including means responsive to each operation of said manually operable marker setting means in said other manner for switching the mode of operation of the timer between said automatic and timer-off modes of operation.

33. The timer of claim 1 or 10 mounted in a housing assembly which is mountable at least in part in a wall switch opening having a conventional toggle wall switch cover plate with a narrow vertical slot, said manually operable marker setting means are connected to motion transmitting means which pass through said vertical slot in the cover plate, and the timer is provided with a manually operable timer condition setting means settable to a power-off condition where power to said timer is interrupted and a timer-on condition where power is connected to said timer and the timer can be operated in said automatic or timer-off modes of operation.

34. The timer of claim 1 or 10 mounted in a housing assembly which is mountable at least in part in a wall switch opening having a conventional toggle wall switch cover plate with a narrow vertical slot, said manually operable time and marker setting means are connected to motion transmitting means which pass through said vertical slot in the cover plate.

35. The timer of claims 1, 4, 5, or 10 wherein there is provided control means responsive to the operation of said marker signal generating member or marker setting means for operating said controlled means to circuit opening and closing condition independently of the markers stored in said storage means during manual programming and the automatic mode of operation of the timer, but being inoperative in this manner to the operation thereof which generates said present time entering signal.

36. The timer of claim 32 wherein said marker setting means when the timer is in said timer-off mode of operation effecting operation of said control means between two conditions thereof.

37. In a programmable timer for controlling the operation of a controlled means, said timer including storage means having respective storage locations assigned to various time intervals where ON or OFF markers can be stored or retained to control said controlled means, manually operable programming means including time setting and marker setting means for setting or retaining said turn-on and turn-off markers in storage locations corresponding to the desired time intervals involved, and means following the completion of the setting or retention of said markers in all of said storage locations for operating the timer in an automatic mode where the storage locations are automatically and synchronously accessed to control the operation of said controlled means in accordance with said markers, the improvement wherein there is provided user operable mode changing means for changing the timer from said automatic mode of operation to a review mode of operation where said markers in said storage locations in said storage means are identified upon further operation of a manually operable means, and means responsive to the failure of the user within a given time to return said timer to said automatic mode of operation for automatically doing so thereafter.

38. The timer of claim 37 wherein said manually operable programming means includes manually rotatable time setting and depressible marker setting means, the depressible marker setting means being outwardly spring urged and thus momentarily depressible, said user operable mode changing means including means responsive to the rotation and unique depression of said rotatable and depressible means to operate the timer between said automatic and review modes of operation and where the position of said rotatable means determines the storage location accessed to determine the marker set therein.

* * * * *